US00RE41706E

(19) United States
(12) Reissued Patent
Glass et al.

(10) Patent Number: US RE41,706 E
(45) Date of Reissued Patent: Sep. 14, 2010

(54) MOVING OBJECTS IN A DISTRIBUTED COMPUTING ENVIRONMENT

(76) Inventors: Graham W. Glass, 2293 Washington St., Apt. 3, San Francisco, CA (US) 94445; Chris K. Wensel, 346 Coronado Ave., Half Moon Bay, CA (US) 94019

(21) Appl. No.: 11/331,418

(22) Filed: Jan. 13, 2006

Related U.S. Patent Documents

Reissue of:
(64) Patent No.: 6,678,743
Issued: Jan. 13, 2004
Appl. No.: 09/451,495
Filed: Nov. 30, 1999

(51) Int. Cl.
*G06F 9/44* (2006.01)
*G06F 9/54* (2006.01)

(52) U.S. Cl. ..... 719/317; 719/316; 719/315; 709/201; 709/202

(58) Field of Classification Search ..... 719/316, 719/317, 328, 330; 709/201
See application file for complete search history.

(56) References Cited

U.S. PATENT DOCUMENTS

| | | | |
|---|---|---|---|
| 5,325,524 | A | 6/1994 | Black et al. |
| 5,341,478 | A | 8/1994 | Travis, Jr. et al. |
| 5,396,630 | A | 3/1995 | Banda et al. |
| 5,432,924 | A | 7/1995 | D'Souza et al. |
| 5,481,721 | A | 1/1996 | Serlet et al. |
| 5,511,197 | A | 4/1996 | Hill et al. |
| 5,577,251 | A | 11/1996 | Hamilton et al. |
| 5,603,031 | A | 2/1997 | White et al. |
| 5,619,710 | A | 4/1997 | Travis et al. |
| 5,634,010 | A | 5/1997 | Ciscon et al. |
| 5,655,101 | A | 8/1997 | O'Farrell et al. |
| 5,724,503 | A | 3/1998 | Kleinman et al. |
| 5,737,607 | A | 4/1998 | Hamilton et al. |
| 5,745,703 | A | 4/1998 | Cejtin et al. |
| 5,778,227 | A | 7/1998 | Jordan |
| 5,781,633 | A | 7/1998 | Tribble et al. |
| 5,787,175 | A | 7/1998 | Carter |
| 5,793,965 | A | 8/1998 | Vanderbilt et al. |
| 5,812,781 | A | 9/1998 | Fahlman et al. |
| 5,812,793 | A | 9/1998 | Shakib et al. |
| 5,822,585 | A | 10/1998 | Noble et al. |
| 5,848,419 | A | 12/1998 | Hapner et al. |
| 5,862,325 | A | 1/1999 | Reed et al. |
| 5,867,665 | A | 2/1999 | Butman et al. |
| 5,881,230 | A | 3/1999 | Christensen et al. |
| 5,897,634 | A | 4/1999 | Attaluri et al. |
| 5,903,725 | A | 5/1999 | Colyer |
| 5,928,335 | A | 7/1999 | Morita |
| 5,956,737 | A | 9/1999 | King et al. |
| 5,983,233 | A | 11/1999 | Potonniee |
| 5,987,506 | A | 11/1999 | Carter et al. |
| 5,999,988 | A | 12/1999 | Pelegri-Llopart et al. |

(Continued)

FOREIGN PATENT DOCUMENTS

| | | |
|---|---|---|
| EP | 0727739 A1 | 8/1996 |
| GB | 2326255 | 12/1998 |

OTHER PUBLICATIONS

Glen McCluskey, "Using Java Reflection," Jan. 1998, 6 pages.*

(Continued)

*Primary Examiner*—Li B Zhen

(57) ABSTRACT

A method for moving objects in a distributed computing system is provided that comprises receiving a move indication (224) at a mobility facet object (206) that is aggregated with a primary facet object (204) through an aggregate object (202) located at a current host address and port number (222). A new aggregate object (246) with the new version (242) of the primary facet object (204) as a new primary facet object (248) and the new version (236) of the mobility facet object (206) as a new mobility facet object (250) are created at a new host address and port number (234).

100 Claims, 14 Drawing Sheets

U.S. PATENT DOCUMENTS

| | | | | |
|---|---|---|---|---|
| 6,006,018 | A | 12/1999 | Burnett et al. | |
| 6,012,067 | A | 1/2000 | Sarkar | |
| 6,012,081 | A | 1/2000 | Dorn et al. | |
| 6,016,393 | A | 1/2000 | White et al. | |
| 6,026,415 | A | 2/2000 | Garst et al. | |
| 6,032,190 | A | 2/2000 | Bremer et al. | |
| 6,041,166 | A | 3/2000 | Hart et al. | |
| 6,044,409 | A | 3/2000 | Lim et al. | |
| 6,061,740 | A | 5/2000 | Ferguson et al. | |
| 6,085,030 | A | 7/2000 | Whitehead et al. | |
| 6,085,086 | A | 7/2000 | La Porta et al. | |
| 6,092,196 | A | 7/2000 | Reiche | |
| 6,134,591 | A | 10/2000 | Nickles | |
| 6,138,235 | A | 10/2000 | Lipkin et al. | |
| 6,138,251 | A | 10/2000 | Murphy et al. | |
| 6,141,759 | A | 10/2000 | Braddy | |
| 6,151,639 | A | 11/2000 | Tucker et al. | |
| 6,157,960 | A | 12/2000 | Kaminsky et al. | |
| 6,178,505 | B1 | 1/2001 | Schneider et al. | |
| 6,182,153 | B1 | 1/2001 | Hollberg et al. | |
| 6,182,154 | B1 | 1/2001 | Campagnoni et al. | |
| 6,182,155 | B1 | 1/2001 | Cheng et al. | |
| 6,195,794 | B1 | 2/2001 | Buxton | |
| 6,205,491 | B1 | 3/2001 | Callsen et al. | |
| 6,212,574 | B1 | 4/2001 | O'Rourke et al. | |
| 6,230,160 | B1 | 5/2001 | Chan et al. | |
| 6,237,135 | B1 | 5/2001 | Timbol | |
| 6,253,253 | B1 | 6/2001 | Mason et al. | |
| 6,253,256 | B1 | 6/2001 | Wollrath et al. | |
| 6,260,078 | B1 | 7/2001 | Fowlow | |
| 6,269,373 | B1 | 7/2001 | Sato et al. | |
| 6,282,580 | B1 | 8/2001 | Chang | |
| 6,304,918 | B1 | 10/2001 | Fraley et al. | |
| 6,321,275 | B1 | 11/2001 | McQuistan et al. | |
| 6,324,543 | B1 * | 11/2001 | Cohen et al. | 707/200 |
| 6,338,089 | B1 | 1/2002 | Quinlan | |
| 6,343,332 | B1 | 1/2002 | Ueda | |
| 6,345,382 | B1 | 2/2002 | Hughes | |
| 6,347,341 | B1 | 2/2002 | Glassen et al. | |
| 6,347,342 | B1 | 2/2002 | Marcos et al. | |
| 6,356,930 | B2 | 3/2002 | Garg | |
| 6,374,308 | B1 | 4/2002 | Kempf et al. | |
| 6,385,661 | B1 | 5/2002 | Guthrie et al. | |
| 6,405,246 | B1 | 6/2002 | Hutchison | |
| 6,415,315 | B1 | 7/2002 | Glass | |
| 6,434,595 | B1 * | 8/2002 | Suzuki et al. | 709/202 |
| 6,438,616 | B1 | 8/2002 | Callsen et al. | |
| 6,442,620 | B1 | 8/2002 | Thatte et al. | |
| 6,446,084 | B1 | 9/2002 | Shaylor et al. | |
| 6,453,333 | B1 | 9/2002 | Glynias et al. | |
| 6,496,871 | B1 * | 12/2002 | Jagannathan et al. | 719/317 |
| 6,513,157 | B1 | 1/2003 | Glass | |
| 6,549,955 | B2 | 4/2003 | Guthrie et al. | |
| 6,567,861 | B1 | 5/2003 | Kasichainula et al. | |
| 6,601,018 | B1 | 7/2003 | Logan | |
| 6,629,128 | B1 | 9/2003 | Glass | |
| 6,701,382 | B1 | 3/2004 | Quirt | |
| 6,714,976 | B1 | 3/2004 | Wilson et al. | |
| 6,851,118 | B1 | 2/2005 | Ismael et al. | |
| 6,931,455 | B1 | 8/2005 | Glass | |
| 6,947,965 | B2 | 9/2005 | Glass | |
| 6,951,021 | B1 | 9/2005 | Bodwell et al. | |
| 6,993,774 | B1 | 1/2006 | Glass | |
| 7,347,342 | B2 | 3/2008 | Grandy | |
| 2001/0003824 | A1 | 6/2001 | Schnier | |

OTHER PUBLICATIONS

Matthew Izatt and Patrick Chan, "Ajents: Toward an Environment for Parallel, Distributed and Mobile Java Applications", Jun. 1999, pp. 1–10.*

Richard Hayton, Mike Bursell, Douglas Donaldson, Andrew Herbert, "Mobile Java Objects," 1998.

Richard Hayton and ANSA Team, "FlexiNet Architecture," Feb. 1999, p. 171–178.

"Life Cycle Service Specification", *CORBA Object Services Specification, Chp. 6, OMG*, c9i.omg.org/docs/formal/97–02–11.pdf,, (Feb. 11, 1997),pp. 6–1 through 6–62.

Bowers, "Some Principles for the Encapsulation of The Behavior of Aggregate Objects", *IEEE*, (1993),6/1–6/4.

Orfali, et al., "The Essentiai Distributed Objects Survival Guide", *Chapter 4, Published by John Wiley & Suns, Inc.,* (1996),67–90.

"The Component Object Model (DRAFT) Specification", *Microsoft Corporation*, Mar. 6, 1995),1–4, 39–46.

McKie, S. "Software Agents: Application Intelligence Goes Undercover", *DBMS*, (Apr. 1995),8.

Brando, Thom "Comparing COBRA and DCE", (Mar. 1996).

Roy, Mark et al., "Interworking COM with COBRA", (May 1996).

Roy, Mark et al., "IChoosing between COBRA and DCOM", (Oct. 1996).

Cappelo, Robert "Overview of RMI Architecture (Computer Science Online Course Notes)", *University of California Santa Barbara Department of Computer Science*, cs.ucsb.edu/–cappello/290i/lectures/rmi/architecture/sld001.htm, (Sep. 7, 1998).

*HOP;OMG's Internet Inter—ORG Protocol,* A Brief discription, printed from omg.org,(1994).

McManis, Chuck "Take an in–depthlook at the java reflection API", *retrieved from JavaWorld.com,* (Sep. 1997),1–10.

Petrie, C. J., "Agent–based Engineering, the Web, and Intelligence", IEEE Expert, (Dec. 1996),12.

Wayner, P. "Free Agents", *BYTE*, (Mar. 1995),7.

Wescom, et al., "The object/agent approach: A computing model for the future", *Object Magazine*, (Mar.–Apr. 1995), 31–33.

Henderson, Sellers et al., "What is This Thing Called Aggregation?", *IEEE*, (Jun. 1999),236–250.

Hayton, Richard et al., "Mobile Java Objects", (1998).

Hayton, Richard et al., "FlexiNet Architecture", (Feb. 1999), 171–178.

Bieszczad, A. "Towards Plug–and–Play Networks wilh Mobile Code", *SCE Technical Report*, (Mar. 1997),17.

Henry, E. et al., "Fine–Grained Mobility in the Emerald System", *ACM*, (Feb. 1998),22.

"SOMobjects Developer's Toolkit Programmer's Guide", vol. I: SOM and DSOM, (Dec. 1996),275–276.

Moons, H. et al., "Object Migration In a Heterogeneous World—A Multi–Dimensional Affair", *IEEE*, (1993),62–72.

"Improved Process for Visual Development of Client/Server Programs", *IBM Technical Disclosure Bulletin,* vol. 41(1), XP–000772108,(Jan. 1998),281–283.

"Passing Proxies as Parameters to Methods and Return Values from Methods", *IBM Technical Disclosure Bulletin,* vol. 41(1), XP–000772037,(Jan. 1998),89–92.

"Distribution Object Activation and Communication Protocols", *IBM Technical Disclosure Bulletin, US, IBM Corp. New York,* vol. 37(7), (Jul. 1, 1994),539–542.

"Java RMI Tutorial", Revision 1.3, JDK 1.1 FCS, Sun Microsystems, (Feb. 10, 1997),1–14.

Spruit, Sandor "Reflections on Java, Beans, and Relational databases", retrieved from JavaWorld.com, (Sep. 1997),1–8.

"Java Core Reflection, API and Specification", *JavaSoft,* (Jan. 1997),40–47.

Glen, McCluskey "Using Java Reflection", *article retrieved from java.sun.com website.,* (Jan. 1998).

"PCT/US99/24510", International Search Report for Appl. No. PCT/US99/24510,(Apr. 19, 2000),4.

Robert, Gray et al., "Mobile agents for mobile computing", *Technical Report PCS–TR96–285, Dept. of Computer Science,* Dartmouth College,(May 1996).

Hof, Markus "Just–in–Time Stub Generation", *Proceedings of the Joint Modular Languages Conference* (*JMLC*) 97, Linz, Austria,(Mar. 19–21, 1997),197–206.

Johansen, Dag et al., "An Introduction to the TACOMA Distributed System Version 1.0", *Technical Report 95–23, Department of Computer Science, University of Troms, Norway,* (Jun. 1995).

Bent, Thomsen et al., "Mobile Agents", *External Report ECRC–92–21, European Computer–Industry Research Center,* (1995).

"The Component Object Model Specification", *Microsoft Corporation and Digital Equipment Corporation,* Chapters 1 and 2 (printed on Oct. 26, 2005 from daimi.au.dk*–datpete/COT/COM SPEC/html/com_spec.html),(Oct. 24, 1995),54.

"Final Office Action", U.S. Appl. No. 11/158,734, (Aug. 20, 2009), 18 pages.

"Non Final Offce Action", U.S. Appl. No. 11/158,734, (Feb. 19, 2010), 21 pages.

"Non Final Action", U.S. Appl. No. 11/858,878, (Mar. 29, 2010), 30 pages.

* cited by examiner

MOVING OBJECTS IN A DISTRIBUTED COMPUTING ENVIRONMENT

Matter enclosed in heavy brackets [ ] appears in the original patent but forms no part of this reissue specification; matter printed in italics indicates the additions made by reissue.

TECHNICAL FIELD OF THE INVENTION

The present invention relates in general to object-oriented technologies and more particularly to a method for moving objects in a distributed computing environment.

BACKGROUND OF THE INVENTION

In object oriented programming, real world objects are modeled by software objects that have encapsulated therein special procedures and data elements. In object-oriented programming terminology, procedures are referred to as methods. To avoid having to redefine the same methods and data members for each and every occurrence of an object, object-oriented programming provides the concept of classes. An inherent structure of one or more levels of increasingly more specialized classes is created to provide templates that define the methods and variables to be included in the objects of each class. The classes at the lower levels of the inheritance structure inherit the behavior, methods, and variables of the classes above. Classes above a certain class in an inheritance structure are referred to as parent classes setting up a parent-child relationship. Therefore, an object belonging to a class is a member of that class, and contains the special behavior defined by the class. In this manner, each object is an instance of a defined class or template and the need to redefine the methods and data members for each occurrence of the object is eliminated.

One example of an object-oriented programming language is Java, developed by Sun Microsystems. To define a class in Java, the programmer creates a .java file containing the source code to define the class. The .java file is compiled to create a .class file containing the executable code to define the class. Instances of the class file are instantiated to create an object containing data and methods defined by the .class file.

Object-oriented programming is a method of programming that abstracts a computer program into manageable sections. The key to object-oriented programming is the concept of encapsulation. Encapsulation is a method by which the subroutines, or methods, that manipulate data are combined with the declaration and storage of that data. This encapsulation prevents the data from arbitrarily being accessed by other programs' subroutines, or objects. When an object is invoked, the associated data is available and can be manipulated by any of the methods that are defined within an object to act upon the data.

The basic component of encapsulation is a class. A class is an abstraction for a set of objects that share the same structure and behavior. An object is a single instance of a class that retains the structure and behavior of the class. Objects also contain methods that are the processes by which an object is instructed to perform some procedure or manipulation of data that it controls. Classes may also be characterized by their interface which defines the elements necessary for proper communication between objects.

Often, a programmer needs to add functionality to an existing class of objects but either does not want to change the existing .class file or does not have access to the source code and, therefore, does not have the ability to alter the source code. In addition, the programmer may not want to alter the functionality of the existing .class file since a .class file may be used in more than one application program. Therefore, it is desirable to add functionality to an existing class of objects during the execution of an application program without altering the associated source code.

Distributed computing allows an object on one computer system to seamlessly communicate with and manipulate an object contained in a second computer system when the two computer systems are connected by a computer network. The second computer system may also be referred to as another address space. Client/server systems are an example of this type of distributed computing system. Sophisticated distributed computing systems have removed the communications burden from the computer programs, or objects in an object oriented programming environment, and placed it in a mid-level operating system that manages communications across a computer network to facilitate a client's access to and manipulation of data contained on a server system. The server system could be a computer in a different address space and remote to a user on a client system.

In distributed processing environments, objects in different address spaces may exchange a large number of messages. Using traditional distributed processing communications techniques may lead to slow response time and increased network traffic. Moving a first object to the same address space as a second object makes communications between the two objects local and, therefore, reduces network traffic. Local messages are often at least one thousand times faster than remote messages sent through the distributed computing system.

SUMMARY OF THE INVENTION

From the foregoing, it may be appreciated that a need has arisen for a method for moving objects in a distributed computing environment. In accordance with the present invention, an improved method for moving objects in a distributed computing environment is provided that substantially eliminate or reduce disadvantages and problems associated with conventional methods for moving objects in a distributed computing environment.

According to an embodiment of the present invention, there is provided a method for moving objects in a distributed computing system that includes receiving a move indication at a mobility object. The mobility object is aggregated with the primary object through an aggregate object located at a current host address and port number. The move indication instructs the mobility object to move the primary object to a new host address and port number. The aggregate object has the primary object as a primary facet object and the mobility object [has] *as* a facet object.

The method then creates a serialized version of the mobility object in response to the move indication. The method then sends the serialized version of the mobility object to the new host address and port number and creates a new version of the mobility object at the new host address and port number from the serialized version of the mobility object. The method then creates a serialized version of the primary object in response to a serialize and move message received from the new version of the mobility object. The method then sends the serialized version of the primary object to the new host address and port number and creates a new version of the primary object at the new host address and port number from the serialized version of the primary object. The method then creates a new aggregate object with the new version of the primary object as a new primary facet object and the new version of the mobility object as a new facet object at the new host address and port number.

The present invention provides various technical advantages over conventional methods for moving objects in a distributed computing environment. For example, one technical advantage is providing a method for objects that exchange a large number of messages to move to a common computer to reduce the amount of time needed for communications and to conserve system resources. Other technical advantages may be readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, in which.

DETAILED DESCRIPTION OF THE INVENTION

Dynamic Aggregation of Objects

Figure 1:
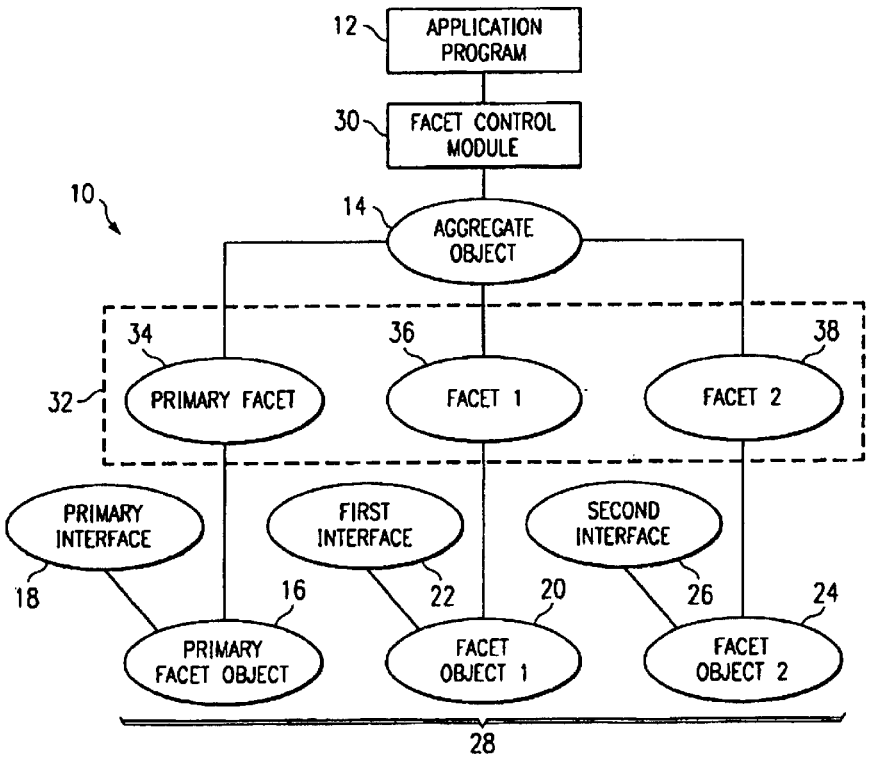
FIG. 1 illustrates a block diagram of an application program utilizing aggregate objects.

Referring to FIG. 1, an application program using dynamically aggregated objects is generally indicated at 10. An application program 12 may access one or more aggregate objects 14 through a facet control module 30. Aggregate object 14 includes a set of facets 32 that may contain one or more facets such as a primary facet 34, a first facet 36, and a second facet 38. One or more facet objects 28 are linked to the set of facets 32 in a one to one correspondence. A primary facet object 16 having a primary interface 18 is linked to primary facet 34, a first facet object 20 having a first interface 22 is linked to first facet 36, and a second facet object 24 having a second interface 26 is linked to second facet 38.

Aggregate object 14 is an aggregation of one or more facet objects 28 within an object-oriented environment. Aggregate object 14 and the associated facet objects 28 function as a single logical object within the object-oriented environment. A change to one of the facet objects 28 creates a logical change in the other facet objects 28 and aggregate object 14. For example, if one of the facet objects 28 moves to a different processing environment, or address space, the aggregate object 14 to which the particular facet object 28 is linked and any other associated facet objects 28 will move as a single logical object to the new, processing environment, or address space. Primary facet objects 16, first facet object 20, and second facet object 24 represent a group of one or more facet objects 28.

Each aggregate object 14 communicates directly with its associated set of facets 32. Each facet within a set of facets 32 is linked to a particular facet object 28. Each facet in the set of facets 32 contains basic information related to its associated facet object 28 to facilitate use of the aggregate object 14 within application program 12. The information contained in each facet in the set of facets 32 for its associated facet object 28 includes the class of the facet object 28 and any interfaces implemented by the facet object 28. In one embodiment, each facet in set of facets 32 is a proxy object created from the associated facet object 28. The proxy object is created by using Java Reflection to determine a particular facet object's 28 name, class, and interfaces. This information is then packaged into a facet in set of facets 32. The particular facet in set of facets 32 is an object that includes the name, class, and interfaces for the associated facet object 28. An interface in an object oriented environment defines the format and information needed to communicate with a particular object. An interface may be referred to as the public view of the object.

During application program development, the software developer may utilize aggregate objects 14 to extend the functionality of existing objects without modifying source code. The software developer extends functionality of an existing object by placing it in an aggregate object 14 as the primary facet object 16 and aggregating additional objects within aggregate object 14 as facet objects 28. Within application program 12, a particular object may be the primary facet object 16 of only one aggregate object 14. Each aggregate object 14 in application program 12 will have a unique primary facet object 16. In one embodiment, a software developer desires to extend the functionality of a specified object to add additional functions such as mobility within a distributed processing environment or the ability to function as an agent within a distributed processing environment. Another example of adding functionality to an existing object would be adding repair history to a car object or adding a bonus plan to an employee object.

The software developer dynamically creates an aggregate object 14 with the specified object as the associated primary facet object 16. The term "dynamically" is used here to refer to using program statements during execution of application program 12 to create aggregate object 14. The software developer then dynamically adds first facet object 20 and second facet object 24 to aggregate object 14. First facet object 20 and second aggregate object 24 provide additional functionality for primary facet object 16. Any method of any facet object 28 may affect all facet objects 28 within aggregate object 14. Therefore, invoking a method on first facet object 20 will effect a change in primary facet object 16.

Application program 12 may create and utilize one or more aggregate objects 14. Each aggregate object 14 has one or more associated facet objects 28. Facet objects 28 may be added and deleted as application program 12 progresses depending upon processing requirements. To access a particular facet object 28, application program 12 may request access to the particular facet object 28 that extends the functionality of a primary facet object 16 by requesting a class or interface using commands that invoke facet control module 30. Facet control module 30 then scans the set of facets 32 associated with the aggregate object 14 identified in the facet control system command until locating the particular facet object 28 that has a class that equals or extends the requested class or implements the requested interface. Facet control module 30 returns a reference to the first facet in the set of facets 32 that has a class that equals or extends the requested class or implements the requested interface. Application program 12 can then invoke the particular facet object 28 by using the returned reference to the facet in the set of facets 32. In another embodiment, facet control system 30 may return a list of all facets within the set of facets 32 with associated facet objects 28 that have a class that equal or extend the requested class or implement the requested interface. Application program 12 *can* then determine which facet object 28 in the returned reference list to invoke.

If no facet object 28 exists that has a class that equals or extends the requested class or implements the requested interface, a not-found condition is returned to application program 12 as a null reference. Application program 12 can then determine whether a new aggregate object 14 should be created, whether an object should be added to an existing aggregate object 14 as an additional facet object 28, or whether appropriate error handling procedures should be performed.

Figure 2:
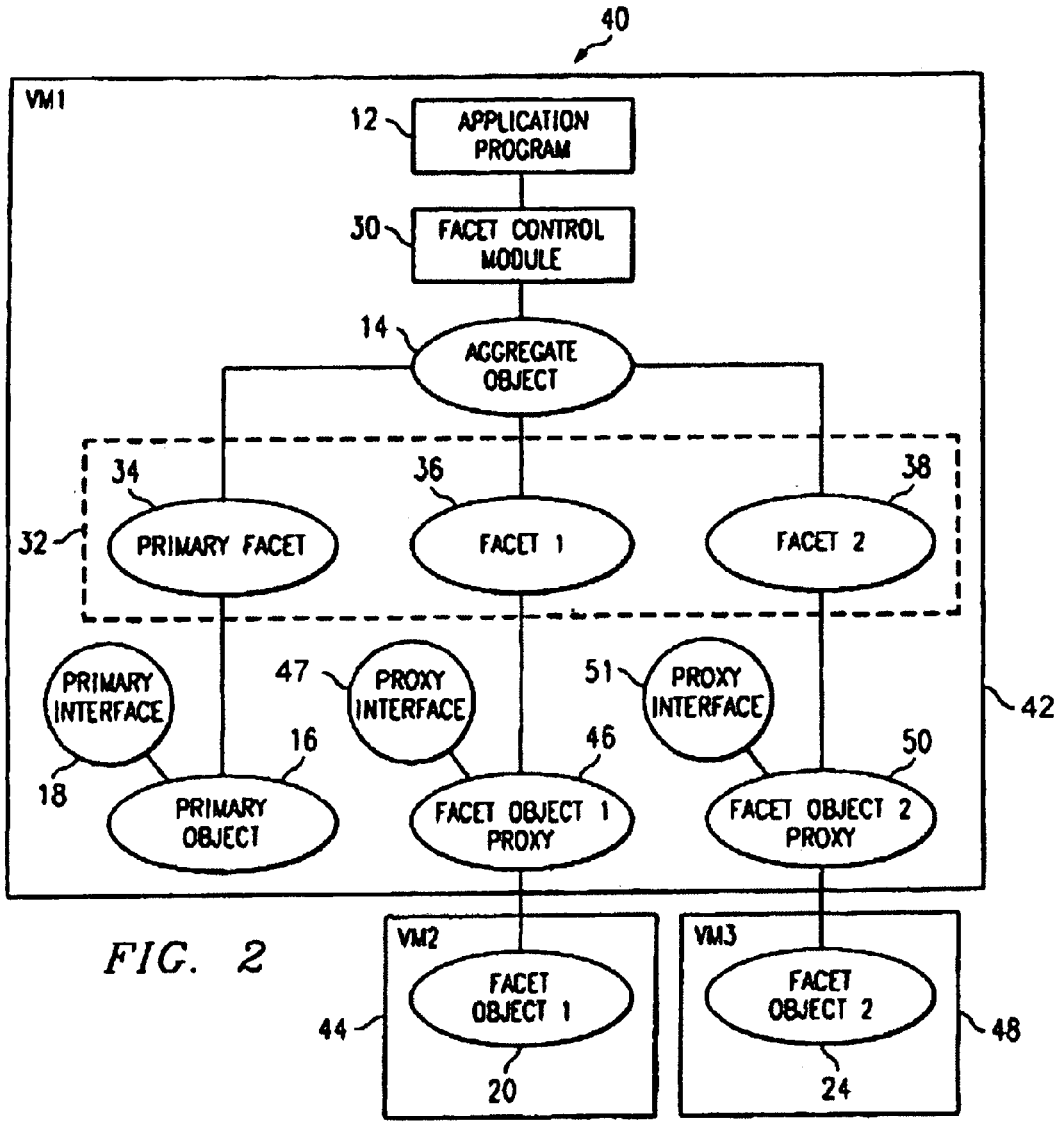
FIG. 2 illustrates a block diagram of the application program utilizing aggregate objects where facet objects are distributed in different processing environments.

Referring to FIG. 2, a system with an application program 12 using dynamically aggregated objects in a distributed processing environment is generally indicated at 40. The structure and operation of system 40 is the same as system 10 except that facet objects 28 may exist within different address spaces in a distributed processing environment and be accessed by aggregate object 14 using proxies.

In system 40, application program 12, facet control module 30, aggregate object 14, set of facets 32 and primary facet object 16 all exist within a first environment 42. First facet object 20 exists within a second environment 44. Communications between aggregate object 14 and first facet object 20 are facilitated by using an appropriate distributed processing system such as an object request broker. In one embodiment, a first facet object proxy 46 resides in first environment 42 and is logically coupled to first facet object 20 in second environment 44. First facet object proxy 46 may be a conventional proxy object created from first facet object 20. First facet object proxy 46 has an interface 47 modeled on first interface 22. Interface 47 has a format and needed information similar to first interface 22. Second facet object 24 resides in a third environment 48. Communications between aggregate object 14 and second facet object 24 are facilitated by using an appropriate distributed processing system such as an object recognition broker. In one embodiment, a second facet object proxy 50 resides in first environment 42 and provides communications between aggregate object 14 and second facet object 24. Second facet object proxy 50 may be a conventional proxy object created from second facet object 24. Second facet object proxy 50 has an interface modeled on second interface 26. Interface 51 has a format and needed information similar to second interface 26.

Figure 3:
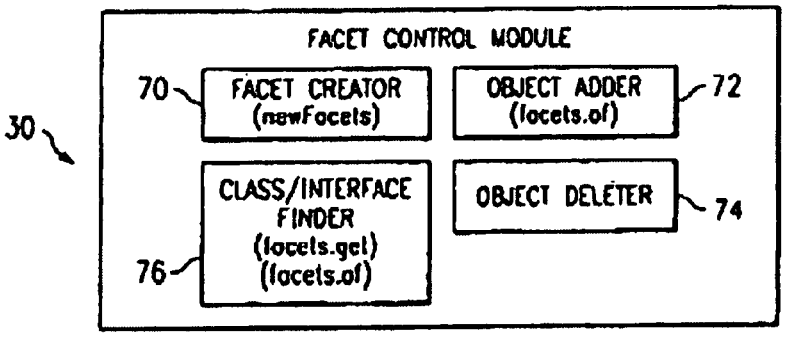
FIG. 3 illustrates a block diagram of a facet control module used within the application program.

Referring to FIG. 3, a facet control module is generally indicated at 30. Facet control module 30 provides dynamic aggregation of existing objects for application program 12. Facet control module 30 consists of several modules including a facet creator 70, an object adder 72, an object deleter 74, and a class/interface finder 76. The functionality of facet control module 30 will be discussed with reference to the flow diagrams of FIGS. 4, 5 and 6.

Figure 4:
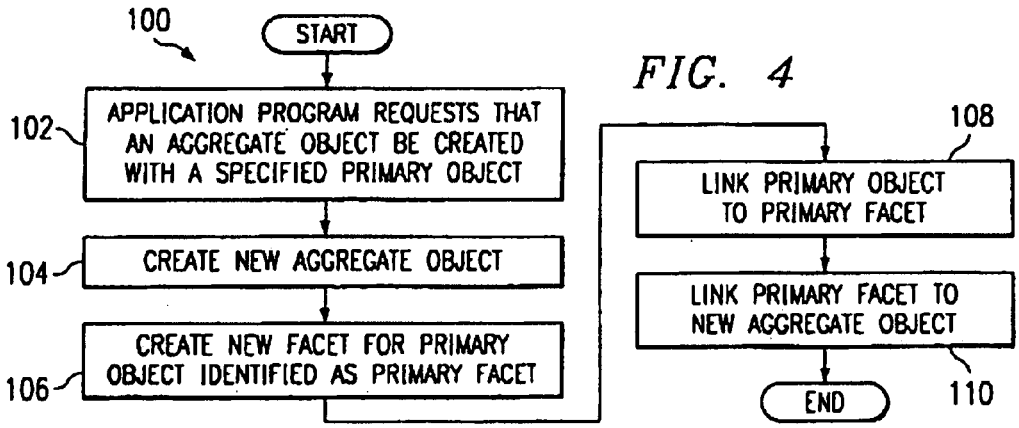
FIG. 4 illustrates a flow diagram illustrating creation of aggregate objects.

Referring to FIG. 4, a flow diagram illustrating a method for dynamically aggregating objects is generally indicated at 100. The method commences at step 102 where application program 12 requests that an aggregate object 14 be created with a specified primary object. The method proceeds to step 104 where facet control module 30 receives the request and forwards it to facet creator 70 to create an aggregate object 14 with a primary facet object 16 of the specified object named in the create aggregate object request. A particular object may be the primary facet object 16 of only one aggregate object 14. The method proceeds to step 106 where a new facet 32 for the specified primary facet object 16 is created as primary facet 34. The method proceeds to step 108 where the specified primary facet object 16 is identified and linked to primary facet 34. The method proceeds to step 110 where primary facet 34 is linked to the new aggregate object 14.

In one embodiment, the following syntax may be used to create an aggregate object 14:

Facets myFacets=new Facets (myPrimary);

where myPrimary identifies an existing object which will become primary facet object 16 within the newly created aggregate object 14 identified as myFacets. Facet control module 30 creates an aggregate object 14 identified as myFacets. Next, facet control module 30 creates a primary facet 34 identified as primaryFacet. Primary facet 34 is linked to aggregate object 14. Next, facet control module 30 creates a primary facet object 16 identified as myPrimary. Primary facet object 16 is linked to primary facet 34. Facet control module 30 creates primary facet 34 such that primary facet 34 contains the class of primary facet object 16 and the interfaces implemented by primary facet object 16.

Figure 5:
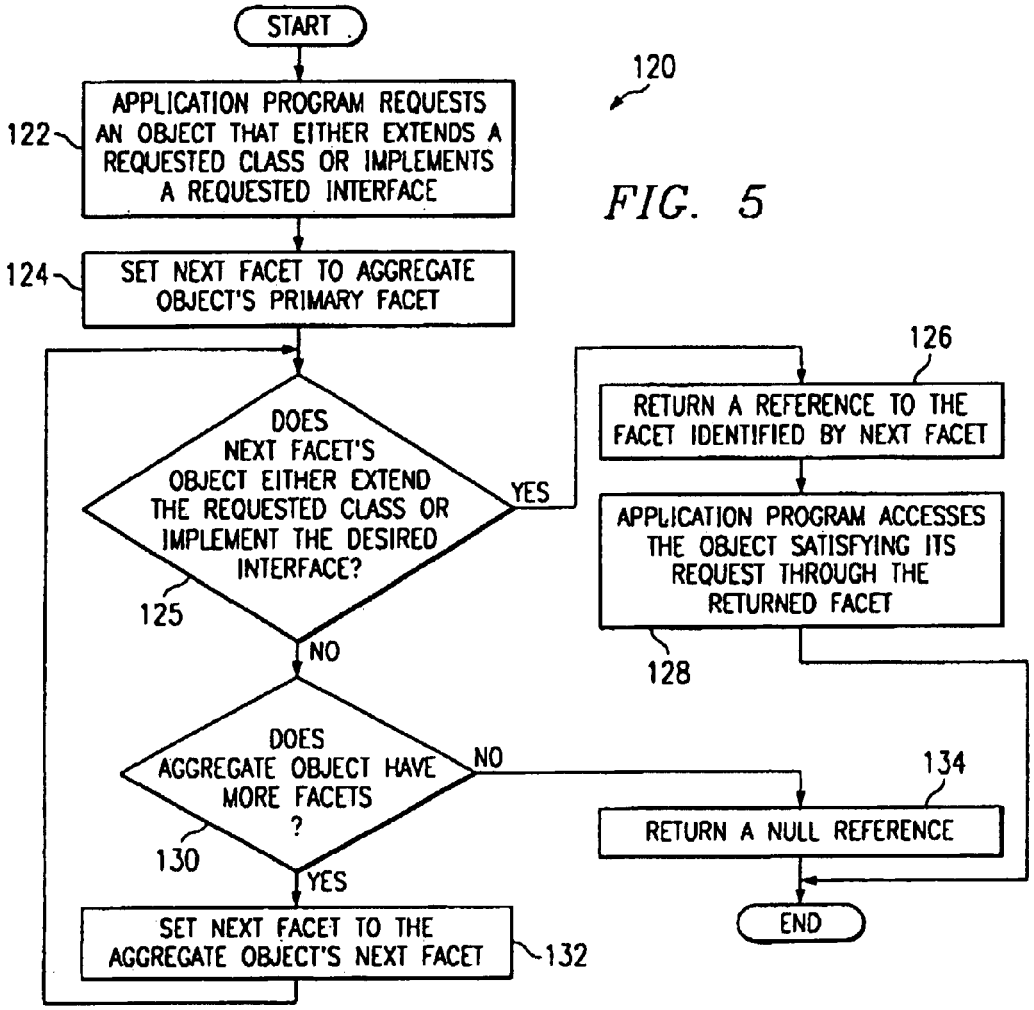
FIG. 5 illustrates a flow diagram illustrating a method of locating an object that extends a requested class or implements a requested interface.

Referring to FIG. 5, a flow diagram illustrating a method for locating an object that extends a requested class or implements a requested interface within an aggregate object 14 is generally indicated at 120. The method proceeds to step 122 where application program 12 requests that facet control module 30 locate a facet object 28 that has a class that equals or extends a requested class or implements a requested interface. Upon receiving this type of request, facet control module 30 forwards the request to class/interface finder 76. In one embodiment, the following syntax may be used to request access to a facet object 28 that has a class that equals or extends the requested class or implements the requested interface:

myfacets.get ("class name");

where myfacets.get identifies the aggregate object 14 (myfacets) and the operation (get) for class/interface finder 76. The class name in the above example may also identify a requested interface name. The method proceeds to step 124 where a facet reference is set to aggregate object's 14 primary facet, primary facet 34. Primary facet 34 should be the first facet in the set of facets 32.

The method proceeds to decisional step 125 where class/interface finder 76 determines if the facet referenced by facet-reference has a class that equals the requested class, has a class that extends the requested class, or implements the requested interface. If the facet in the set of facets 32 identified by the facet-reference meets one of the above tests, the Yes branch of decisional step 125 proceeds to step 126 where class/interface finder 76 returns a reference to the facet in the set of facets 32 identified by the facet-reference. The method proceeds to step 128 where application program 12 uses the returned reference to identify the facet object 28 through the reference to a facet in the set of facets 32. Application program 12 then invokes the facet object 28. After step 128, the method terminates.

Returning to decisional step 125, if the facet in the set of facets 32 identified by the facet-reference does not meet one of the aforementioned tests, the No branch of decisional step 125 proceeds to decisional step 130 where class/interface finder 76 determines whether aggregate object 14 has more facets within its associated set of facets 32. If the set of facets 32 includes more facets, the Yes branch of decisional step 130 proceeds to step 132 where the facet-reference is set to the next facet, first facet 36 in this example, in the set of facets 32 associated with aggregate object 14. The method returns to decisional step 125 to process the next facet identified by the facet-reference.

Returning to decisional step 130, if the set of facets 32 associated with aggregate object 14 does not include more facets, the No branch of decisional step 130 proceeds to step 134 where a null reference is returned. Application program 12 would then perform appropriate error processing upon receipt of the null reference. After step 134, the method terminates.

Figure 6:
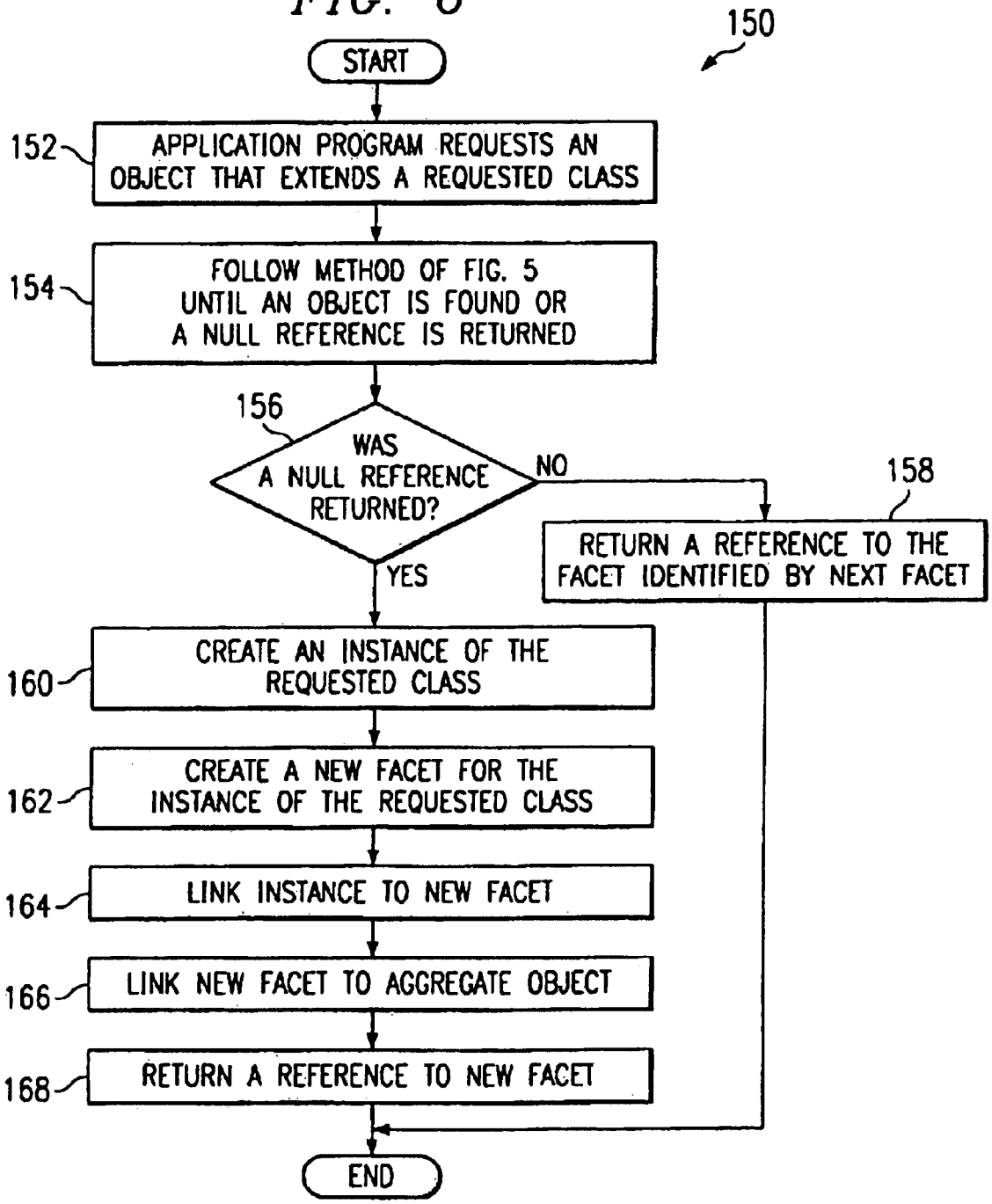
FIG. 6 illustrates a flow diagram illustrating a method for adding a class to an aggregate object.

Referring to FIG. 6, a flow diagram illustrating a method for adding objects to an aggregate object 14 is generally indicated at 150. The method commences at step 152 where application program 12 requests a facet object 28 that has a class that equals or extends a requested class. In one embodiment, the following syntax may be used to add objects to a aggregate object 14 as facet objects 28:

myFacets.of ("class name");

where the desired aggregate object 14 is identified (myFacets) and the desired operation is also identified (.of). "Class name" refers to an existing .class file. When adding facet objects to aggregate object 14, class names should be used so that an instance of the class may be generated and added to aggregate object 14 as a facet object 28.

The method proceeds to step 154 where the method of FIG. 5 identified in steps 122–126 and 130–134 is performed until a facet within the set of facets 32 associated with aggregate object 14 is found that has a class that equals or extends the requested class or a null reference is returned.

The method proceeds to decisional step 156 where a determination is made regarding whether a null reference was returned. If a null reference was not returned, the No branch of decisional step 156 proceeds to step 158 where the reference received from step 126 in the method of FIG. 5 is returned. If a null reference is not received, the requested class has already been added to the set of facets 32 in aggregate object 14 and processing may continue. After step 158 the method terminates.

Returning to decisional step 156, if a null reference is received, the Yes branch of decisional step 156 proceeds to step 160 where object adder 72 creates an instance of the requested class. The method proceeds to step 162 where object adder 72 creates a new facet for the instance of the requested class. Object adder 72 creates the new facet by adding the requested class and the interfaces implemented by that class to the new facet. The new facet is an object that summarizes available information regarding the associated facet object that in this example is the created instance of the requested class. The new facet becomes a member of the set of facets 32 associated with the aggregate object 14.

The method proceeds to step 164 where object adder 72 links the instance of the requested class created in step 160 to the new facet created in step 162. The method proceeds to step 166 where object adder 72 links the new facet created in step 162 to the aggregate object 14. The method proceeds to step 168 where a reference to the new facet created in step 162 is returned. After step 168, the method terminates.

In one embodiment, the facets.of command that is used to add objects to an existing aggregate object 14 may be used by software developers when they have determined that a requested class should be part of aggregate object 14 but they are not sure that the requested class has been added to facet objects 28 that are associated with aggregate object 14. By using this type of command, the software developer requests a facet object 28 that has a class that equals or extends a requested class and is guaranteed that a reference to a facet object 28 will be returned.

In addition to the above-referenced sample commands, one embodiment of the present invention includes the following command to determine the primary facet object 16 of aggregate object 14:

myFacets.getPrimary ( );

where the desired aggregate object 14 is identified as myFacets and the desired operation is identified as getPrimary. The sample command returns a reference to primary facet object 16.

Another sample command from one embodiment of the present invention includes the following command to determine the members of set of facets 32 associated with aggregate object 14;

myFacets.getFacets ( );

where the desired aggregate object 14 is identified as myfacets and the desired operation is identified as getfacets. The sample command returns a list of each facet object 28 associated with aggregate object 14.

Object deleter 74 of facet control module 30 provides a software developer with the ability to delete a specified object from facet objects 28. The software developer identifies the particular facet object 28 to be removed from aggregate object 14 and instructs facet control module 30 to remove the specified facet object from aggregate object 14. Object deleter 74 physically deletes the associated facet in set of facets 32 and removes the link between the specified facet object and aggregate object 14. If the specified facet object has no remaining references, an operating system of the object oriented environment may remove the specified facet object from the object oriented environment during a garbage collection procedure.

Movement

An object may be made mobile within a distributed processing environment by defining the object as a primary facet object 16 linked to an aggregate object 14 and aggregating a mobility object as a second facet object 24 as previously described. To move an object from one address space to another address space, a mobility method is invoked within aggregate object 14. As previously described, aggregate object 14 then locates the facet without one or more facet objects 28 that provides the requested method. The mobility method may be invoked directly on the mobility facet object. In that case, the mobility facet object informs the aggregate object that the mobility method has been invoked. In another embodiment, the functionality of mobility is built into the object. To cause that object to move from one address space to another address space, a mobility method is invoked on the object.

Referring to FIGS. 7A–7F, the process of moving an object from one address space to another address space within a distributed computing system is depicted. The location of an object may be generally defined as "host:portnumber/alias". For example, the location of an object may be "dallas:8000/store1", where "dallas" defines the host address, "8000" defines the port number, and "store1" defines an alias for the object. The host may be referred to by host name or an IP address. An object may be an agent which is defined as a specialized object that possesses the characteristic of autonomy. Autonomy is the ability to program an agent with one or more goals that it will attempt to satisfy, even when it has moved into a network on other platforms and has lost all contact with its creator. Agents also have the additional abilities of movement, persistence and event generation.

FIGS. 7A–7F utilize a modified illustration of the structure of the aggregate object depicted in FIG. 1. Aggregate object 202, primary facet object 204, and mobility facet object 206 each have a local reference and a reference holder. The reference holder and local reference are together equivalent to a member of set of facets 32. Aggregate object 202 has a local reference 208 and a reference holder 210. Reference holder 210 is linked to local reference 208 and receives and routes messages to aggregate object 202 through local reference 208. Local reference 208 contains an address identifying the physical location of aggregate object 202. Similarly, primary facet object 204 has a local reference 212 and a reference holder 214. Mobility facet object 206 has a local reference 216 and a reference holder 218. Aggregate object 202 is linked to both reference holder 214 for primary facet object 204 and to reference holder 218 for mobility facet object 206. A primary object proxy 220 is linked to primary facet object 204 through reference holder 214. Any message received by primary object proxy 220 is forwarded to reference holder 214 that further forwards the message to primary object 204. Aggregate object 202, primary facet object 204, mobility facet object 206, and their associated local references and reference holders may be generally referred to as an aggregate group 200.

Figure 7A:
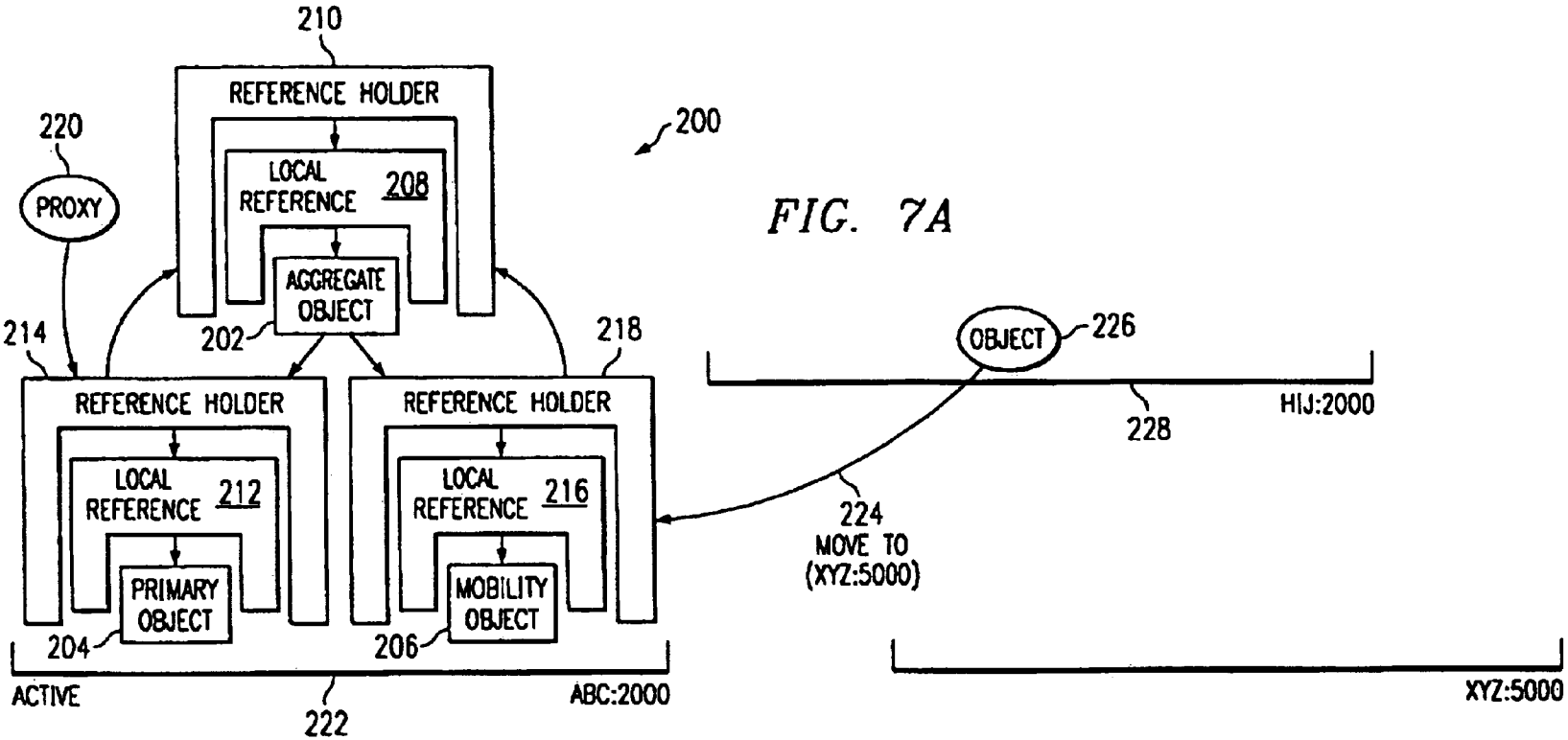
FIGS. 7A–7F illustrate an exemplary process for moving an object from one host address and port number to another host address and port number within a computer network.

The movement process begins in FIG. 7A where mobility facet object 206 located at a current host address and port number 222 receives a move indication 224. Move indication 224 may be received from a requesting object 226 located at an originating host address and port number 228. Requesting object 226 may be any object or application in the distributed computing system and may exist in any address space including an address space on the current host for aggregate group 200. Aggregate group 200 may also be an agent that carries its own move indication 224.

Figure 7B:
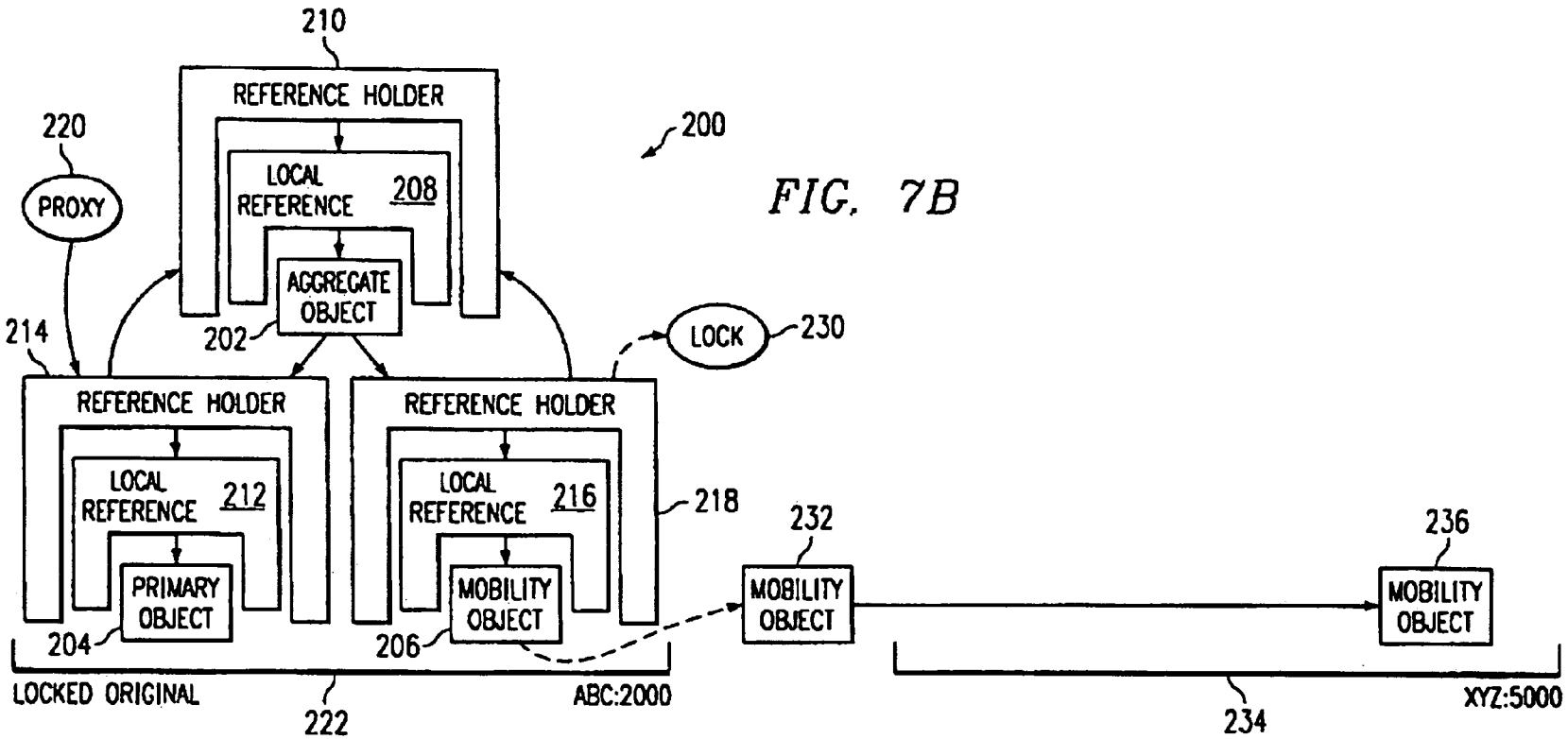

In response to move indication 224, the move operation continues in FIG. 7B where mobility facet object 206 accesses a lock object 230 in order to block all incoming messages to aggregate group 200 while aggregate group 200 is moving to a new host address and port number. Mobility facet object 206 creates a serialized version 232 of itself at current host address and port number 222. The serialized version 232 is then sent to a desired new host address and port number 234. The serialized version may be created by mobility facet object 206 sending a message containing itself as a parameter. A new version 236 of mobility facet object 206 is created at new host address and port number 234 from the serialized version 232.

Figure 7C:
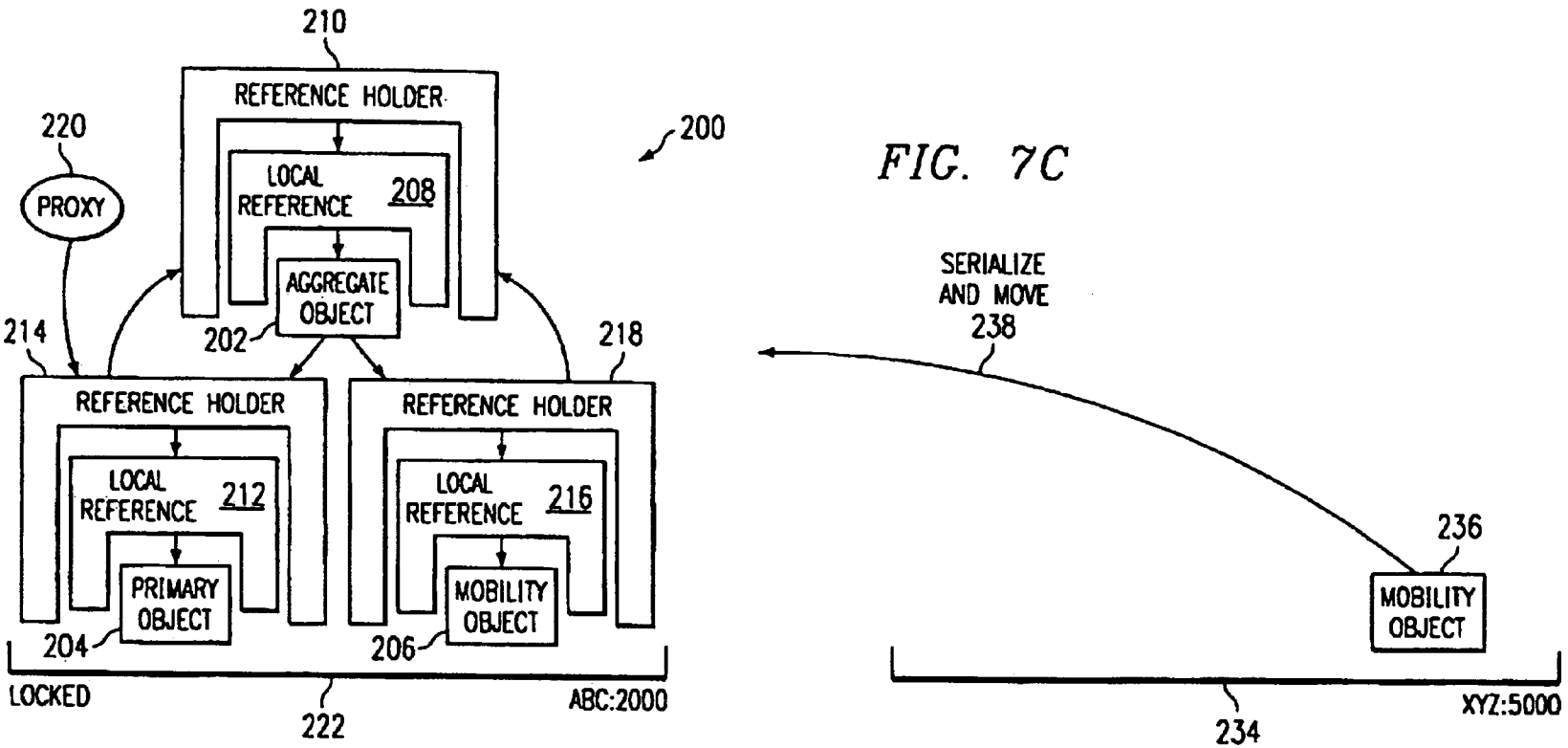

The move operation continues in FIG. 7C where the new version 236 of mobility facet object 206 creates a serialize and move message 238 and sends it to aggregate group 200 at current host address and port number 222. The serialize and move message 238 informs aggregate group 200 that the initial phase of moving was successful and that the other serializable parts of aggregate group 200 should be serialized and sent to new host address and port number 234.

Figure 7D:
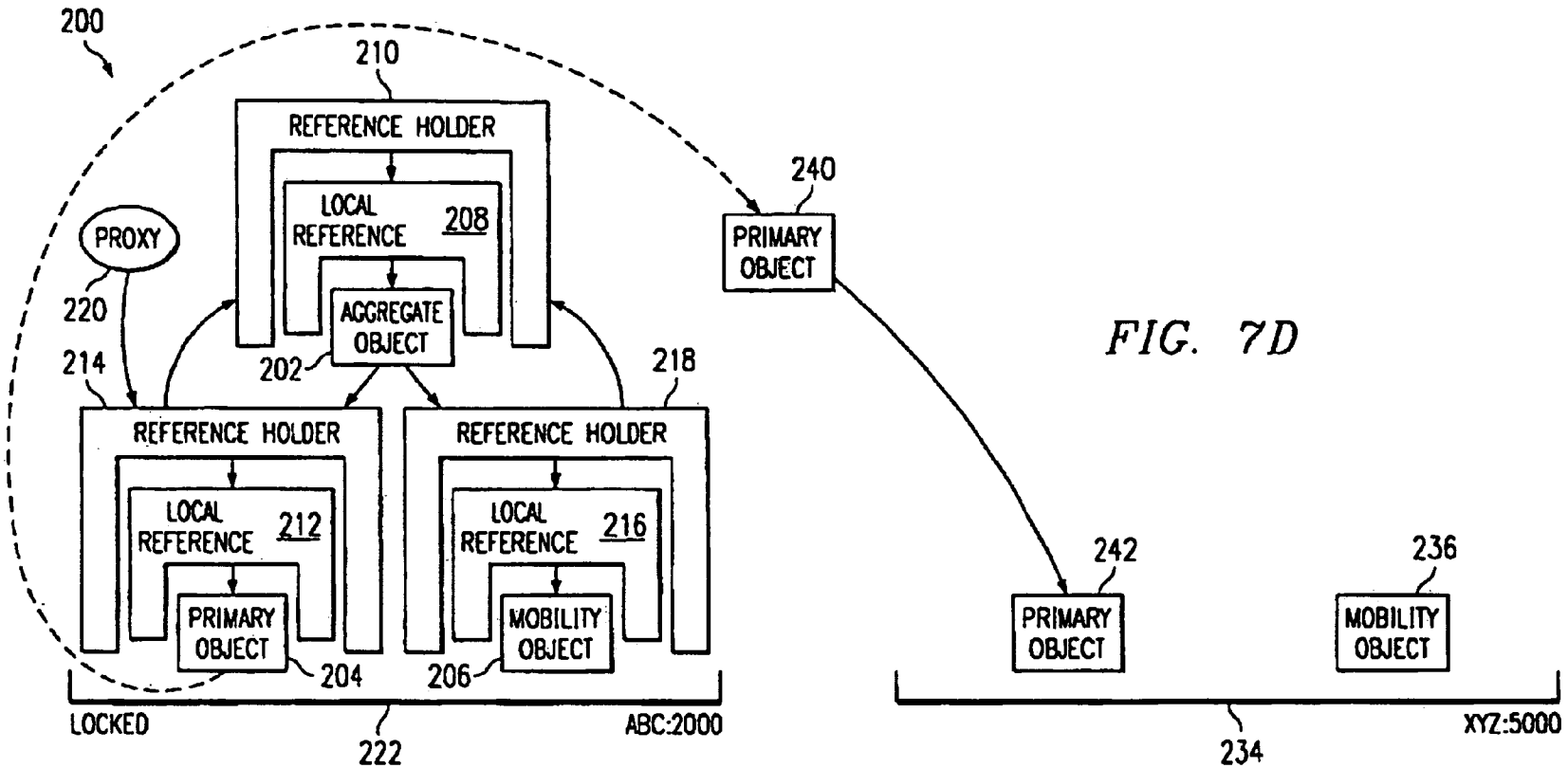

The move operation continues at FIG. 7D where the aggregate group 200 receives the serialize and move message 238. Aggregate group 200 forwards the serialize and move message 238 to primary facet object 204. Primary facet object 204 creates a serialized version 240 of itself at current host address and port number 222. The serialized version 240 is then sent to the new host address and port number 234. A new version 242 of primary facet object 204 is created at new host address and port number 234 from the serialized version 240.

Figure 7E:
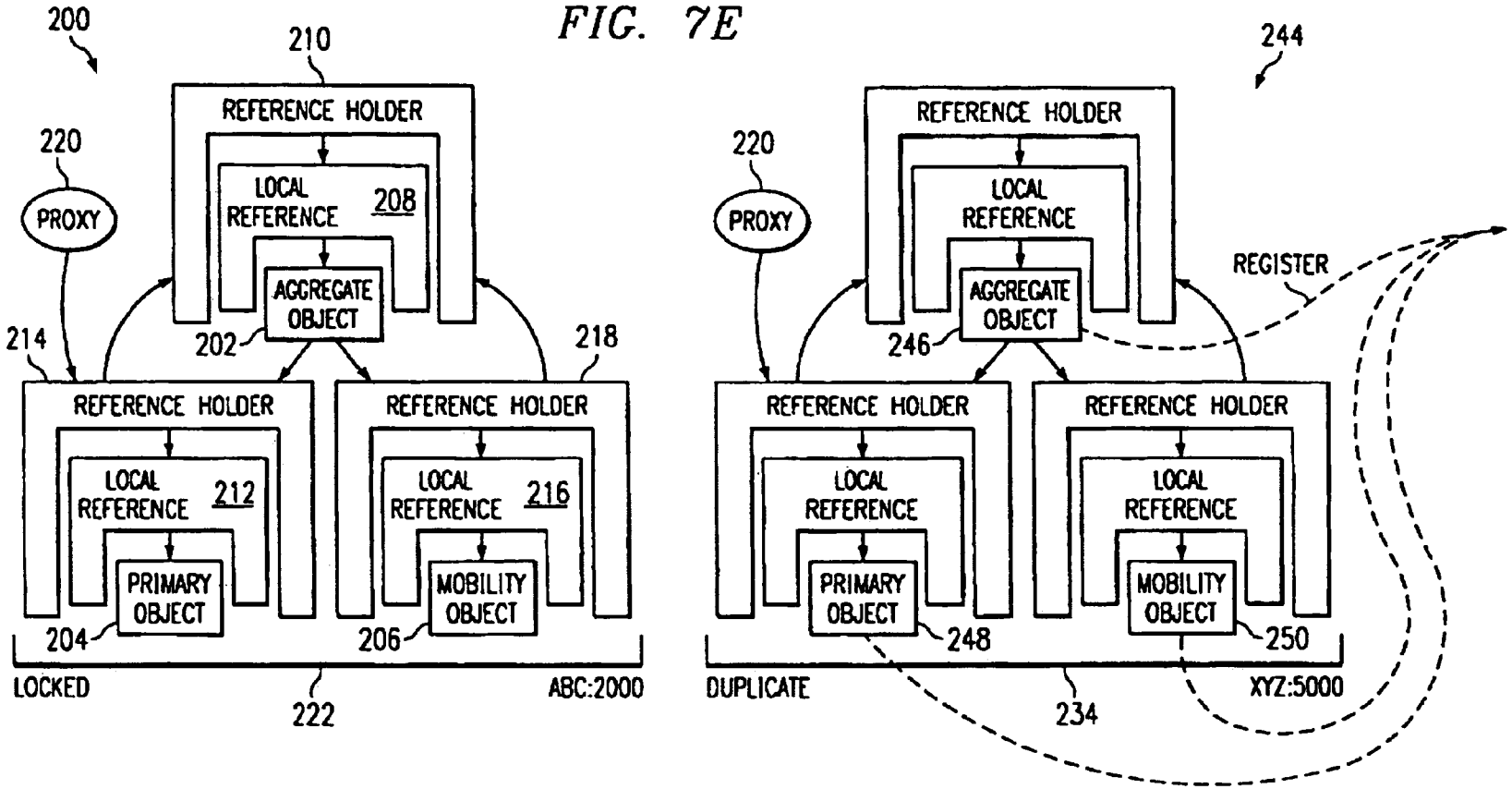

The move operation continues at FIG. 7E where a new aggregate group 244 is generated as previously described with a new aggregate object 246, new version 242 of primary facet object 204 as a new primary facet object 248 and new version 236 of mobility facet object 206 as a new mobility facet object 250. New aggregate group 244 and new aggregate object 246 register at new host address and port number 234 along with new version 236 of mobility facet object 206 and new version 242 of primary facet object 204.

Figure 7F:
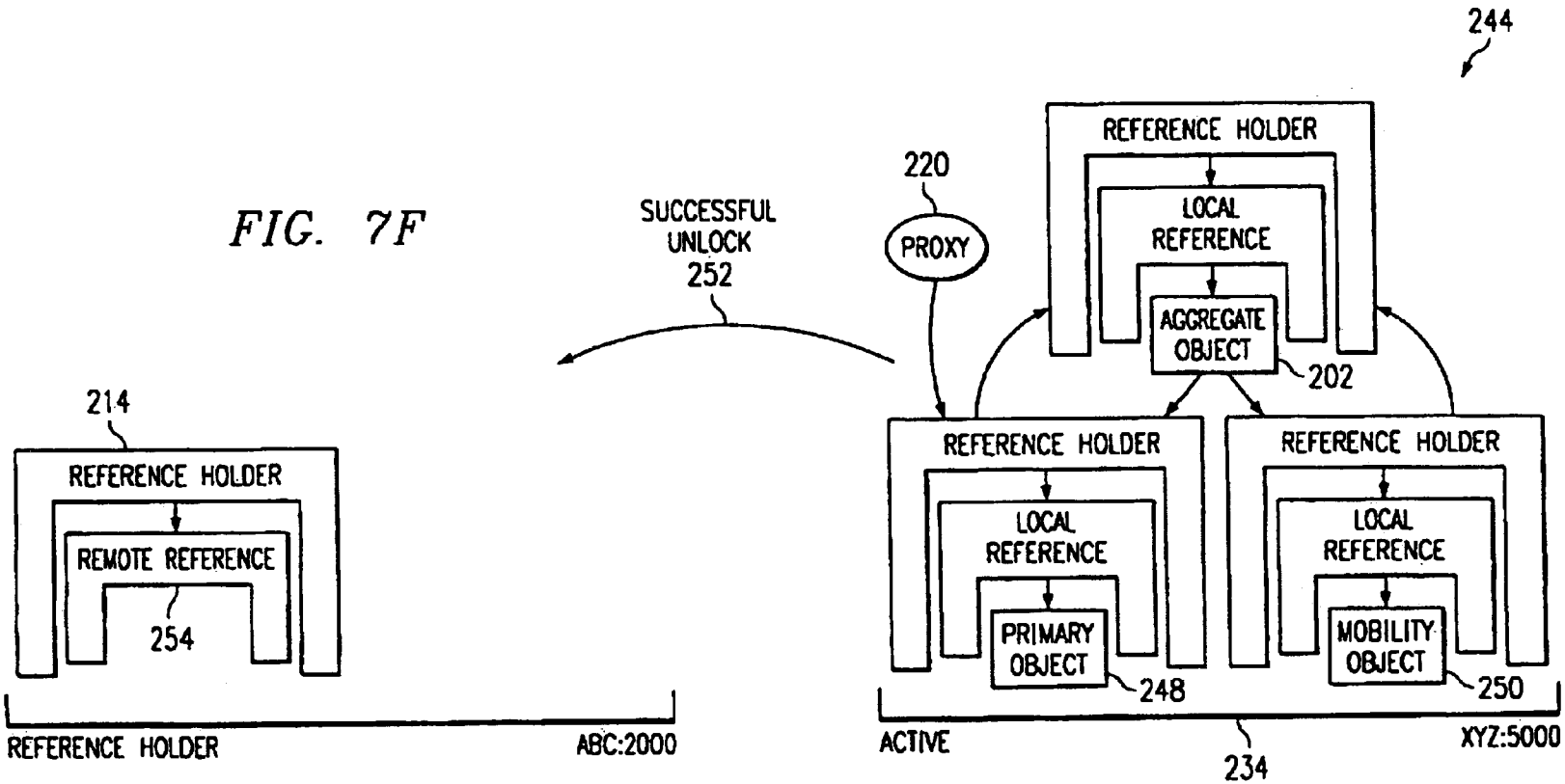

The move operation continues at FIG. 7F where new aggregate group 244 sends a successful message 252 to aggregate group 200 at current host address and port number 222. Aggregate group 200, aggregate object 202, primary facet object 204, and mobility facet object 206 deregister from current host address and port number 222. In addition, aggregate object 202 severs its links to mobility facet object 206 and primary facet object 204. Aggregate object 202 and mobility facet object 206 are garbage collected by the system. In addition, all references to primary facet object 204 are removed such that it is garbage collected by the system. Local reference 212 of primary facet object 204 is updated with new host address and port number 234 and becomes remote reference 254. Reference holder 214 remains a reference holder at current host address and port number 222 for new version 242 of primary facet object 204 at new host address and port number 234. Reference holder 214 is coupled to remote reference 254 that contains the address of the physical location of new version 242 of primary facet object 204. Reference holder 214 is used to forward messages destined for primary facet object 204 to new host address and port number 234.

Figure 8A:
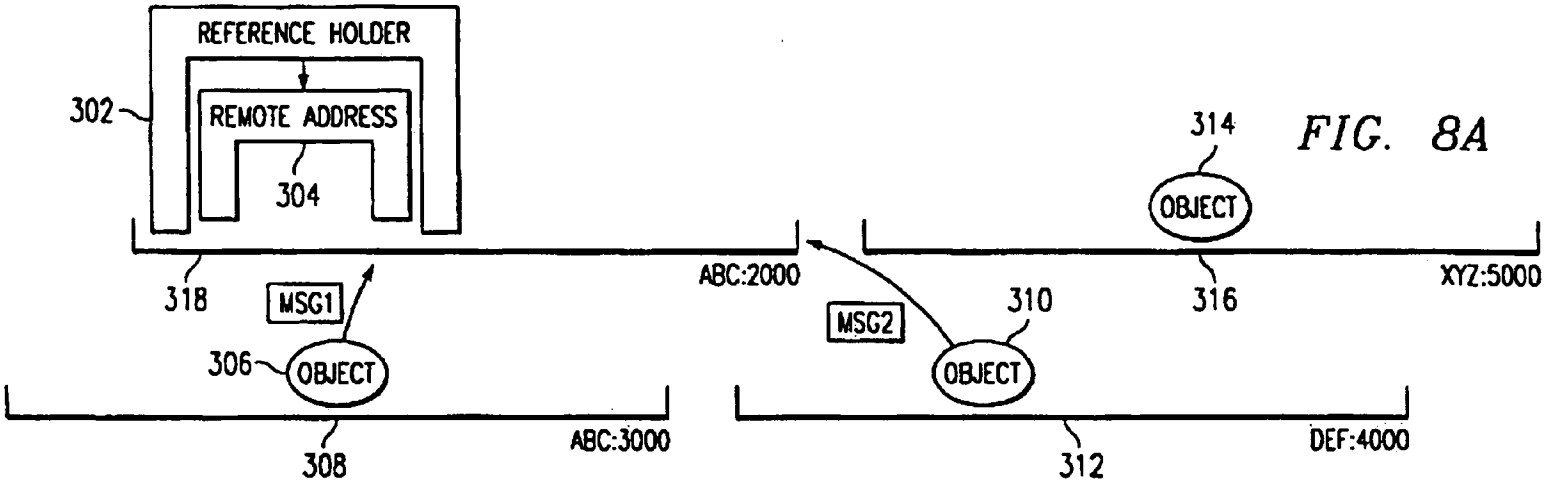
FIGS. 8A–8B illustrate an exemplary process for forwarding messages by a reference holder.
Figure 8B:
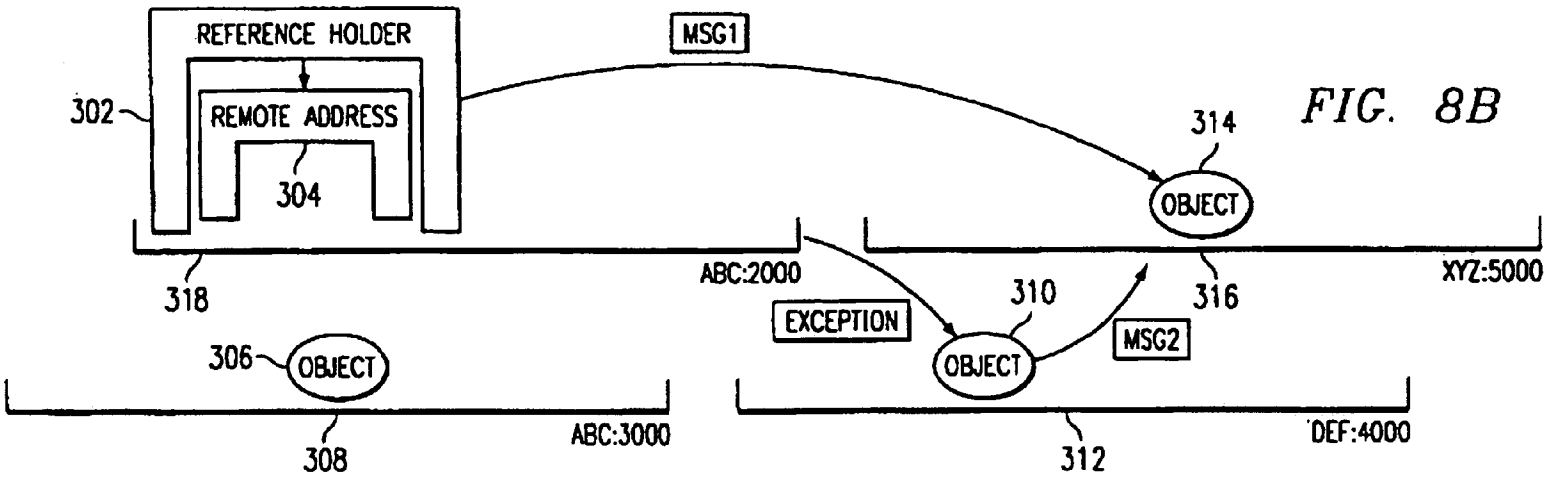

Messages that were blocked by lock object 230 are released and forwarded as necessary to new host address and port number 234 as discussed in detail with relation to FIGS. 8A and 8B.

Forwarding

Referring to FIGS. 8A–8B, the process of forwarding messages for a moved object is illustrated. The forwarding operation begins at FIG. 8A where message MSG1 from an object 306 at a first host address and port number 308 and message MSG2 from an object 310 at a second host address and port number 312 require processing by an object 314. Object 314 has moved to a new host address and port number 316. Object 314 may be an aggregate group such as new aggregate group 244. Messages MSG1 and MSG2 may be messages that were previously sent but were blocked as a result of move indication 224 or may be messages sent from out of date objects at host address and port numbers not knowing that object 314 has moved to new host address and port number 316. A reference holder 302 and a remote address 304 occupy an old host address and port number 318 previously occupied by object 314. In this example, old host address and port number 318 and first host address and port number 308 exist in the same address space identified by the host address. Thus communications between object 306 and reference holder 302 are local.

The forwarding operation continues at FIG. 8B where reference holder 302, having the new host address and port number 316 for object 314 stored in remote reference 304, reroutes message MSG1 to object 314 at new host address and port number 316. Messages, such as message MSG1, that are local with respect to reference holder 302 may be directly forwarded to the new location for an object referenced in the message since the message travels through only one host address on its way to a destination host address.

Reference holder 302 receives message MSG and determines that it is a remote message. In one embodiment, a remote message is determined by comparing the host address of the object originating the message with the host address of the reference holder 302. After determining that message MSG2 is a remote message, reference holder 302 throws an "object moved" exception to object 310. Object 310 catches the "object moved" exception and resends message MSG2 to new host address and port number 316 identified in the "object moved" exception. All future messages from object 310 are sent directly to object 314 at new host address and port number 316. By using the "object moved" exception, messages destined for a target object do not pass through an intermediate host address thereby making communications between objects more efficient.

Callbacks

Figure 9A:
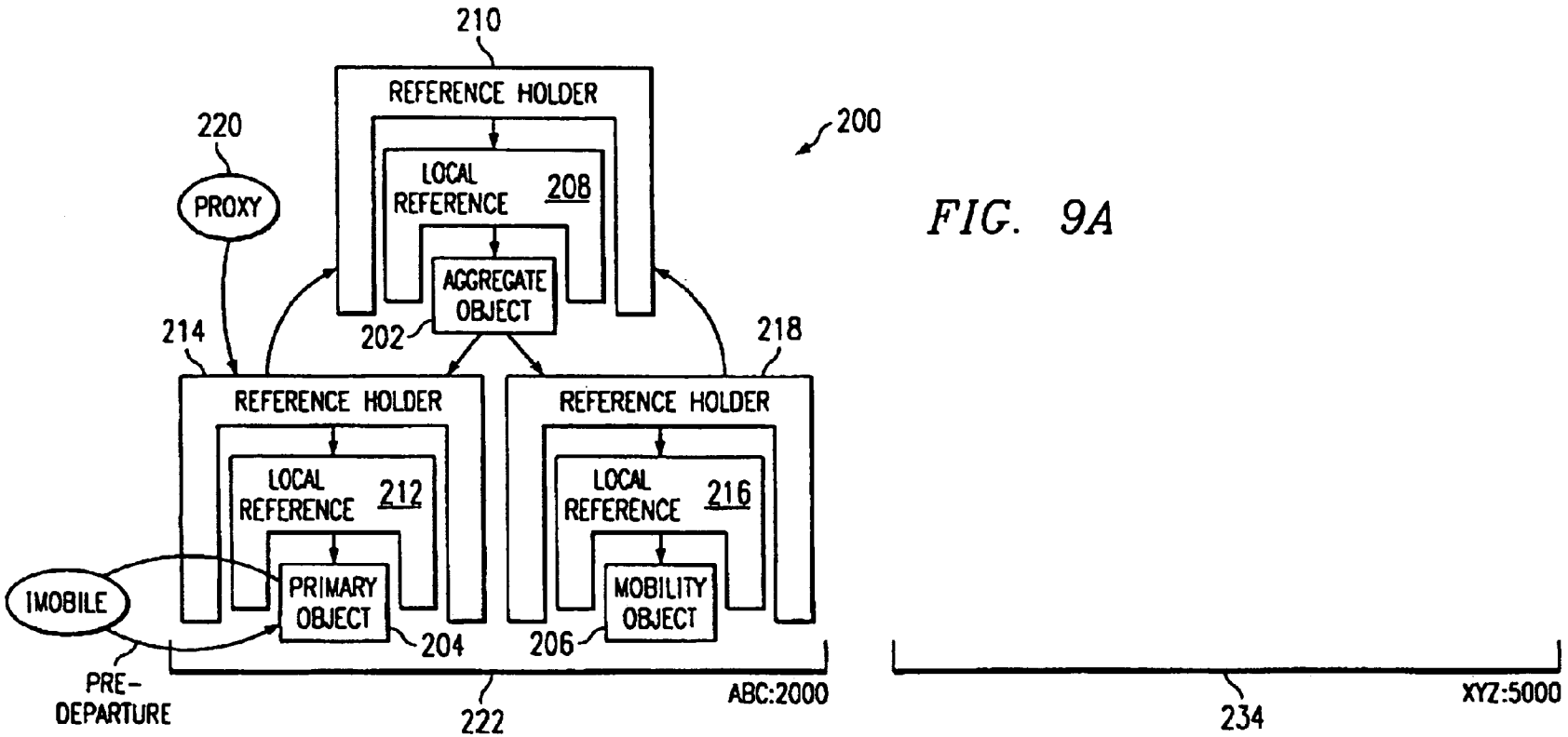
FIGS. 9A–9C illustrate various move notifications that may occur while moving the object from one host address and port number to another host address and port number within the computer network.
Figure 9B:
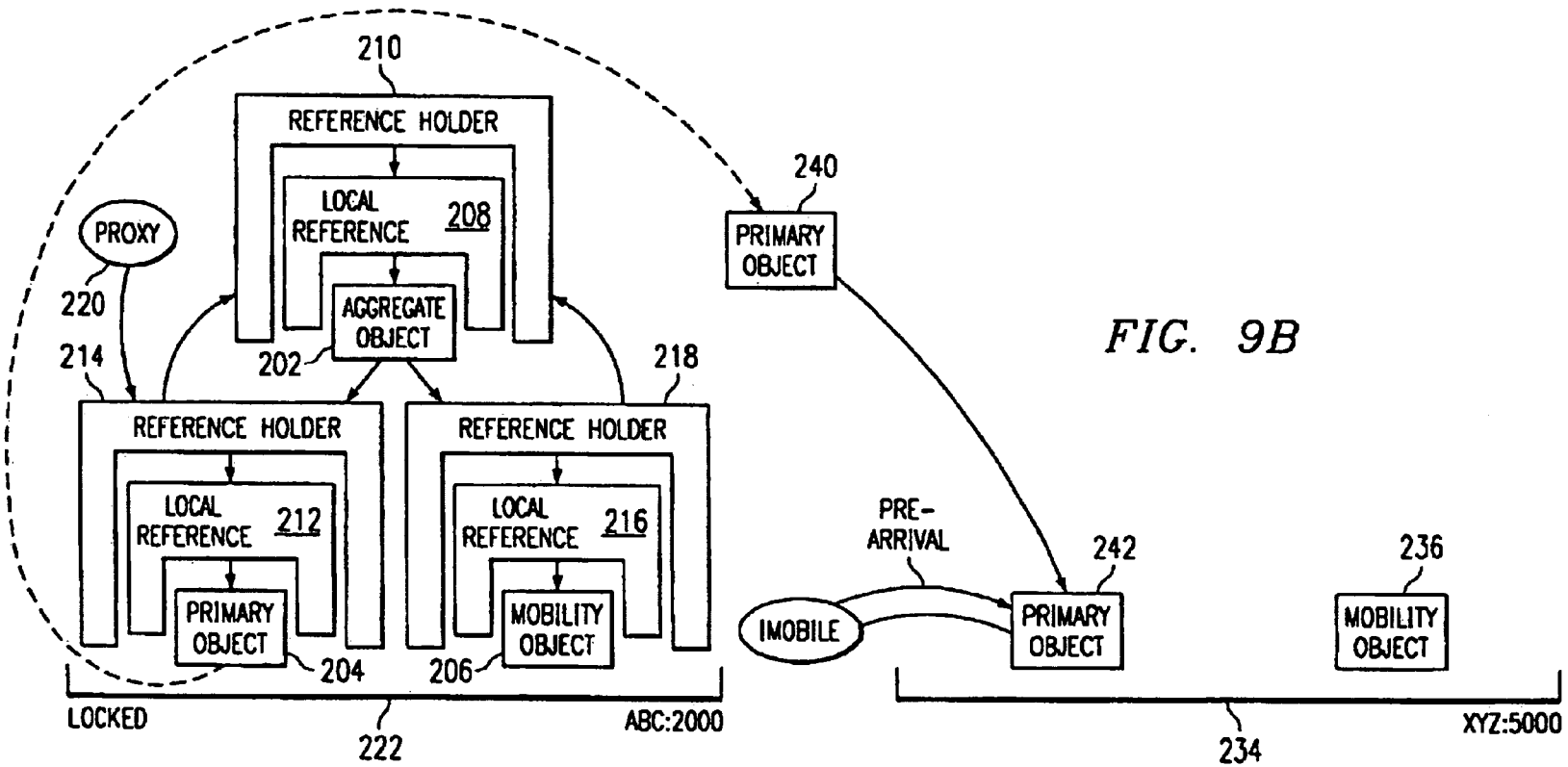
Figure 9C:
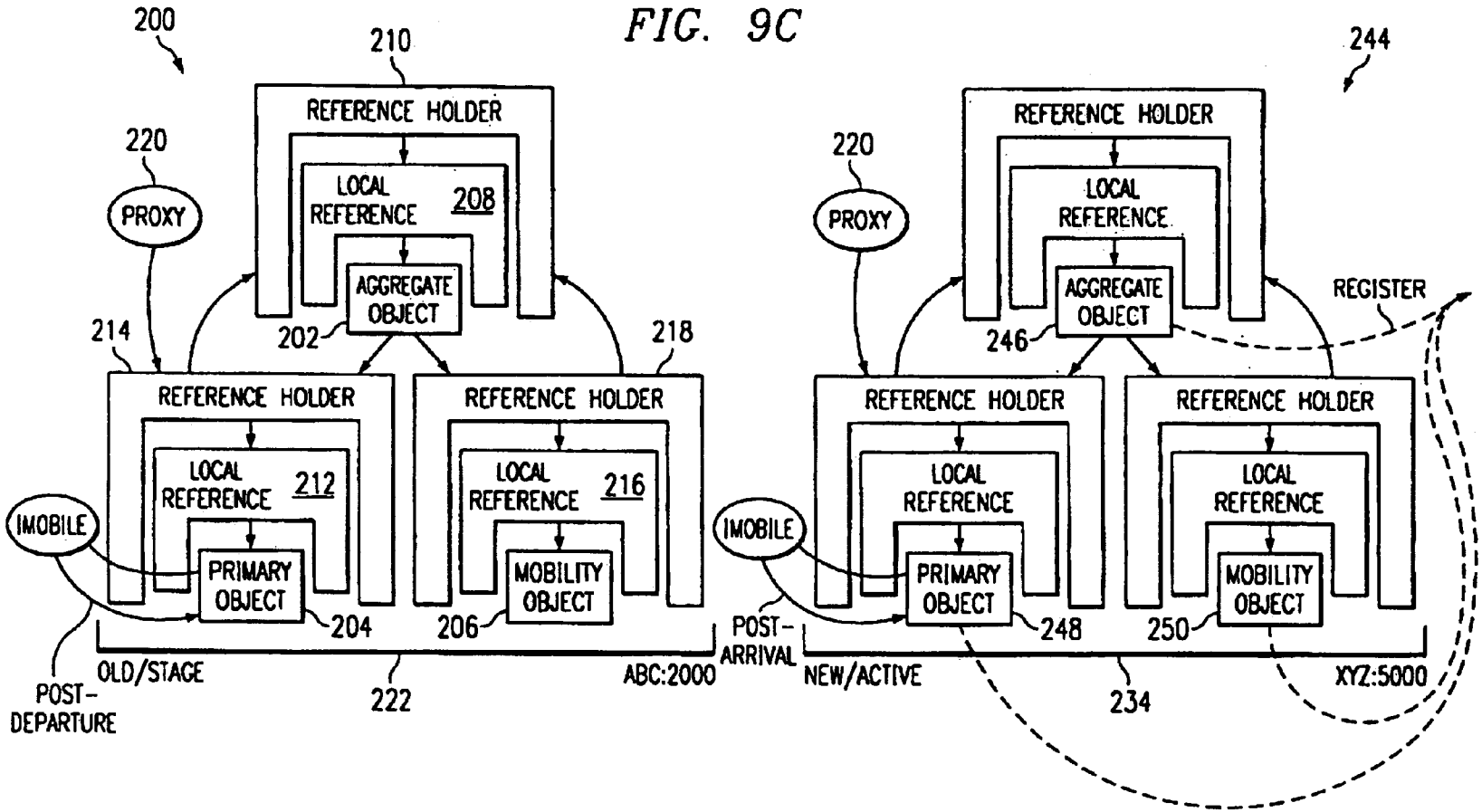

Referring to FIGS. 9A–9C, various callback notifications that may occur during the movement of an object from current host address and port number 222 to new address and port number 234 are illustrated. Callback notifications may be sent provided that primary facet object 204 requests callback notification. In one embodiment, primary facet object 204 implements a specified Java interface to request callback notifications. However, any suitable method of requesting callback notifications may be used such as setting a callback notification flag.

FIG. 9A illustrates a pre-departure notification for primary facet object 204 at current host address and port number 222. Upon receipt of move notification 224, a pre-departure notification may be generated for primary facet object 204 to determine if primary facet object 204 is available to be moved. If primary facet object 204 determines that it is not available to be moved, primary facet object 204 may throw a mobility exception causing the move to abort. The mobility exception may be thrown for any reason as determined by primary facet object 204 such as processing required to be completed at current host address and port number 222 has not been completed.

FIG. 9B illustrates a pre-arrival notification for new version 242 of primary facet object 204 at new host address and port number 234. The pre-arrival notification occurs immediately after new version 242 of primary facet object 204 is created from serialized version 240 at new host address and port number 234. The pre-arrival notification may be used by new version 242 of primary facet object 204 to determine if new version 242 was successfully created. If the new version 242 was not successfully created or any other suitable error condition exists within new version 242 of primary facet object 204, new version 242 may throw a mobility exception causing the move to abort.

FIG. 9C illustrates post-movement callback notifications. After new aggregate group 244 registers at new host address and port number 234, a post-arrival callback notification may be sent to new version 242 of primary facet object 204 at new host address and port number 234. At this point, new aggregate group 244 is the active object and the move cannot be aborted. Thus, the move is deemed successful. This callback notification allows new aggregate group 244 to perform specific post-move processing that is not provided by the system.

After new aggregate group 244 registers at new host address and port number 234 but prior to aggregate group 200 disconnecting its component parts, a post-departure callback notification may be sent to primary facet object 204. At this point, the component parts of aggregate group 200 are considered stale since a new active aggregate group 244 exists at new host address and port number 234. The post-departure callback notification allows aggregate group 200 to perform internal final processing before its component parts are delinked and garbage collected and prior to unblocking any messages at current host address and port number 222.

Thus, it is apparent that there has been provided in accordance with the present invention, a method for moving objects in a distributed computing environment that satisfies the advantages set forth above. Although the present invention and its advantages have been described in detail, it should be understood that various changes, substitutions, and alterations may be readily apparent to those skilled in the art and may be made herein without departing from the spirit and the scope of the present invention as defined by the following claims.

What is claimed is:

1. A method for moving objects in a distributed computing system, comprising:

receiving a move indication at a mobility object aggregated with a primary object through an aggregate object located at a current host address and port number, the primary object being unique to the aggregate object, the mobility object providing a mobility functionality for the primary object, the move indication instructing the mobility object to move the primary object to a new host address and port number, the aggregate object having the primary object as a primary facet object and the mobility object as a facet object;

creating a serialized version of the mobility object in response to the move indication;

sending the serialized version of the mobility object to the new host address and port number;

creating a new version of the mobility object at the new host address and port number from the serialized version of the mobility object;

creating a serialized version of the primary object in response to a serialize and move message from the new version of the mobility object;

sending the serialized version of the primary object to the new host address and port number;

creating a new version of the primary object at the new host address and port number from the serialized version of the primary object;

creating a new aggregate object with the new version of the primary object as a new primary facet object and the new version of the mobility object as a new facet object at the new host address and port number.

2. The method of claim 1, further comprising:

locking the aggregate object at the current host address and port number in response to the move indication; and unlocking the aggregate object at the current host address and port number in response to creating the new aggregate object at the new host address and port number.

3. The method of claim 1, further [comprising:] *comprising* retaining an old version of the aggregate object, the primary object, and the mobility object at the current host address and port number.

4. The method of claim 1, further [comprising:] *comprising* aggregating the mobility object at the current host address and port number with the primary object at the current host address and port number, the mobility object linked to an aggregate object at the current host address and port number, the primary object linked to the aggregate object at the current host address and port number.

5. The method of claim 1, further comprising instructing the primary object to move to the new host address and port number by invoking a method on the mobility object at the current host address and port number for moving the primary object to the new host address and port number.

6. The method of claim 1, further comprising:

informing the primary object at the current host address and port number that the primary object is about to be moved in response to the move indication;

performing pre-departure processing by the primary object at the current host address and port number;

determining whether the object is available to move;

vetoing the move in response to determining that the object is not available to move; and affirming the move in response to determining that the object is available to move.

7. The method of claim 1, further comprising:

completing messages currently being processed by the primary object at the current host address and port number; and suspending new messages arriving at the primary object at the current host address and port number.

8. The method of claim 7, further [comprising:] *comprising* forwarding suspended messages to the new host address and port number for processing.

9. The method of claim 1, further comprising:

storing the new host address and port number in a reference holder at the current host address and port number; and forwarding messages received at the current host address and port number for the primary object to the new version of the primary object at the new host address and port number.

10. The method of claim 1, further [comprising:] *comprising* registering the new aggregate object and the new version of the primary object at the new host address and port number.

11. The method of claim 1, further comprising:

deregistering the aggregate object and the primary object at the current host address and port number; and garbage collecting the aggregate object and the primary object at the current host address and port number.

12. The method of claim 1, further comprising:

sending a message from a proxy to the primary object at the current host address and port number;

throwing an exception back to the proxy indicating that the primary object has moved to the new host address and port number; and resending the message from the proxy to the new version of the primary object at the new host address and port number in response to the exception.

13. The method of claim 1, further comprising:

sending a message from a proxy to the primary object at the current host address and port number; and forwarding the message from the current host address and port number to the new version of the primary object at the new host address and port number.

14. The method of claim 1, further comprising:

evaluating the sending of the serialized version of the primary object and creating of the new version of the primary object by querying the new version of the primary object to determine if the sending and creating was successful; and aborting the method for moving objects in response to an unsuccessful sending and creating.

15. The method of claim 1, further [comprising:] *comprising* sending a serialize and move message from the new version of the mobility object at the new host address and port number to the primary object at the current host address and port number, the serialize and move message including an indication that the new version of the mobility object has been established at the new host address and port number.

16. The method of claim 1, further comprising:

locking the aggregate object at the current host address and port number in response to the move indication;

sending a successful move message from the new aggregate object at the new host address and port number to the aggregate object at the current host address and port number;

unlocking the aggregate object at the current host address and port number;

deregistering the aggregate object and the primary object at the current host address and port number in response to the successful move message;

storing the new host address and port number in a reference holder at the current host address and port number, the reference holder used for forwarding messages received for the primary object at the current host address and port number.

17. The method of claim 1, further comprising:

informing the new version of the primary object at the new host address and port number that movement of the aggregate object at the current host address and port number has started;

performing pre-arrival processing by the new version of the primary object at the new host address and port number;

determining whether the new version of the primary object at the new host address and port number authorizes completion of the method for moving objects; and aborting the method for moving objects in response to a negative authorization from the new version of the primary object at the new host address and port number.

18. The method of claim 11, further comprising:

informing the new aggregate object at the new host address and port number that the aggregate object at the current host address and port number has been deregistered;

performing post-arrival processing by the aggregate object at the current host address and port number.

19. The method of claim 1, further comprising:

informing the aggregate object at the current host address and port number that creation of the new aggregate object at the new host address and port number has completed;

performing post-departure processing by the aggregate object at the current host address and port number.

*20. A method for moving objects in a distributed computing system, comprising:*

*dynamically aggregating a mobility object with a primary object to create an aggregate object located at a current host location, the primary object being unique to the aggregate object and the mobility object providing a mobility functionality for the primary object, and the*

*aggregate object including the primary object as a primary facet object and the mobility object as a facet object;*

*receiving a move indication at the mobility object, the move indication instructing the mobility object to move the primary object to a new host location;*

*sending a new version of the mobility object to the new host location in response to the move indication; and*

*sending a new version of the primary object to the new host location in response to a move message from the new version of the mobility object;*

*wherein a new aggregate object is created at the new host location, the new aggregate object having the new version of the primary object associated with the new version of the mobility object.*

*21. The method of claim 20, further comprising:*

*serializing the new version of the mobility object prior to sending;*

*wherein the new version of the mobility object is created at the new host location from the serialized version of the mobility object; and*

*serializing the new version of the primary object prior to sending;*

*wherein the new version of the primary object is created at the new host location from the serialized version of the primary object.*

*22. The method of claim 20, wherein the new aggregate object at the new host location comprises the new version of the primary object as a new primary facet object and the new version of the mobility object as a new facet object.*

*23. The method of claim 20, wherein the current host location is characterized by a current host address and port number, and the new host location is characterized by a new host address and port number.*

*24. The method of claim 20, further comprising:*

*locking the aggregate object at the current host location in response to the move indication; and*

*unlocking the aggregate object at the current host location in response to creating the new aggregate object at the new host location.*

*25. The method of claim 20, further comprising retaining an old version of the aggregate object, the primary object, and the mobility object at the current host location.*

*26. The method of claim 20, further comprising instructing the primary object to move to the new host location by invoking a method on the mobility object at the current host location for moving the primary object to the new host location.*

*27. The method of claim 20, further comprising:*

*informing the primary object at the current host location that the primary object is about to be moved in response to the move indication;*

*performing pre-departure processing by the primary object at the current host location;*

*determining whether the primary object is available to move;*

*vetoing the move in response to determining that the primary object is not available to move; and*

*affirming the move in response to determining that the primary object is available to move.*

*28. The method of claim 20, further comprising:*

*completing messages currently being processed by the primary object at the current host location; and*

*suspending new messages arriving at the primary object at the current host location.*

*29. The method of claim 28, further comprising forwarding suspended messages to the new host location for processing.*

*30. The method of claim 20, further comprising:*

*storing the new host location in a reference holder at the current host location; and*

*forwarding messages received at the current host location for the primary object to the new version of the primary object at the new host location.*

*31. The method of claim 20, wherein the new aggregate object and the new version of the primary object are registered at the new host location.*

*32. The method of claim 20, further comprising:*

*deregistering the aggregate object and the primary object at the current host location; and*

*garbage collecting the aggregate object and the primary object at the current host location.*

*33. The method of claim 20, further comprising:*

*sending a message from a proxy to the primary object at the current host location;*

*sending an exception back to the proxy indicating that the primary object has moved to the new host location; and*

*resending the message from the proxy to the new version of the primary object at the new host location in response to the exception.*

*34. The method of claim 20, further comprising:*

*sending a message from a proxy to the primary object at the current host location; and*

*forwarding the message from the current host location to the new version of the primary object at the new host location.*

*35. The method of claim 20, further comprising:*

*evaluating the sending of the new version of the primary object by querying the new version of the primary object to determine if the sending was successful; and*

*aborting the method for moving objects in response to an unsuccessful sending.*

*36. The method of claim 20, further comprising receiving a move message from the new version of the mobility object at the new host location at the primary object at the current host location, the move message including an indication that the new version of the mobility object has been established at the new host location.*

*37. The method of claim 20, further comprising:*

*locking the aggregate object at the current host location in response to the move indication;*

*receiving a successful move message from the new aggregate object at the new host location at the aggregate object at the current host location;*

*unlocking the aggregate object at the current host location;*

*deregistering the aggregate object and the primary object at the current host location in response to the successful move message; and*

*storing the new host location in a reference holder at the current host location, the reference holder used for forwarding messages received for the primary object at the current host location.*

*38. The method of claim 20, further comprising:*

*informing the new version of the primary object at the new host location that movement of the aggregate object at the current host location has started;*

*wherein pre-arrival processing is performed by the new version of the primary object at the new host location;*

*determining whether the new version of the primary object at the new host location authorizes completion of the method for moving objects; and*

*aborting the method for moving objects in response to a negative authorization from the new version of the primary object at the new host location.*

*39. The method of claim 32, further comprising:*

*informing the new aggregate object at the new host location that the aggregate object at the current host location has been deregistered; and*

*performing post-arrival processing by the aggregate object at the current host location.*

*40. The method of claim 20, further comprising:*

*informing the aggregate object at the current host location that creation of the new aggregate object at the new host location has completed; and*

*performing post-departure processing by the aggregate object at the current location.*

*41. One or more computer-readable storage media comprising computer-executable instructions that, when executed, direct a computer to move an object in a distributed computing environment, the computer-executable instructions configured to:*

*dynamically aggregate a mobility object with a primary object to create an aggregate object located at a current host location, the primary object being unique to the aggregate object and the mobility object providing a mobility functionality for the primary object, and the aggregate object including the primary object as a primary facet object and the mobility object as a facet object;*

*receive a move indication at the mobility object, the move indication instructing the mobility object to move the primary object to a new host location;*

*send a new version of the mobility object to the new host location in response to the move indication;*

*send a new version of the primary object to the new location in response to a move message from the new version of the mobility object; and*

*create a new aggregate object at the new host location, the new aggregate object having the new version of the primary object associated with the new version of the mobility object.*

*42. One or more computer-readable storage media as recited in claim 41, further comprising computer-executable instructions configured to:*

*serialize the new version of the mobility object prior to sending;*

*create the new version of the mobility object at the new host location from the serialized version of the mobility object;*

*serialize the new version of the primary object prior to sending; and*

*create the new version of the primary object at the new host location from the serialized version of the primary object.*

*43. One or more computer-readable storage media as recited in claim 41, wherein the current host location is characterized by a current host address and port number, and the new host location is characterized by a new host address and port number.*

*44. One or more computer-readable storage media as recited in claim 41, further comprising computer-executable instructions configured to:*

*lock the aggregate object at the current host location in response to the move indication; and*

*unlock the aggregate object at the current host location in response to creating the new aggregate object at the new host location.*

*45. One or more computer-readable storage media as recited in claim 41, further comprising computer-executable instructions configured to retain an old version of the aggregate object, the primary object, and the mobility object at the current host location.*

*46. One or more computer-readable storage media as recited in claim 41, further comprising computer-executable instructions configured to instruct the primary object to move to the new host location by invoking a method on the mobility object at the current host location for moving the primary object to the new host location.*

*47. One or more computer-readable storage media as recited in claim 41, further comprising computer-executable instructions configured to:*

*inform the primary object at the current host location that the primary object is about to be moved in response to the move indication;*

*perform pre-departure processing by the primary object at the current host location;*

*determine whether the primary object is available to move;*

*veto the move in response to determining that the primary object is not available to move; and*

*computer readable program code configured to affirm the move in response to determining that the primary object is available to move.*

*48. One or more computer-readable storage media as recited in claim 41, further comprising computer-executable instructions configured to:*

*complete messages currently being processed by the primary object at the current host location; and*

*suspend new messages arriving at the primary object at the current host location.*

*49. One or more computer-readable storage media as recited in claim 41, further comprising computer-executable instructions configured to forward suspended messages to the new host location for processing.*

*50. One or more computer-readable storage media as recited in claim 41, further comprising computer-executable instructions configured to:*

*store the new host location in a reference holder at the current host location; and*

*forward messages received at the current host location for the primary object to the new version of the primary object at the new host location.*

*51. One or more computer-readable storage media as recited in claim 41, further comprising computer-executable instructions configured to register the new aggregate object and the new version of the primary object at the new host location.*

*52. One or more computer-readable storage media as recited in claim 41, further comprising computer-executable instructions configured to:*

*deregister the aggregate object and the primary object at the current host location; and*

*garbage collect the aggregate object and the primary object at the current host location.*

*53. One or more computer-readable storage media as recited in claim 41, further comprising computer-executable instructions configured to:*

*send a message from a proxy to the primary object at the current host location;*

*throw send an exception back to the proxy indicating that the primary object has moved to the new host location; and*

*resend the message from the proxy to the new version of the primary object at the new host location in response to the exception.*

*54. One or more computer-readable storage media as recited in claim 41, further comprising computer-executable instructions configured to:*

*send a message from a proxy to the primary object at the current host location; and*

*forward the message from the current host location to the new version of the primary object at the new host location.*

*55. One or more computer-readable storage media as recited in claim 41, further comprising computer-executable instructions configured to:*

*evaluate the sending of the new version of the primary object by querying the new version of the primary object to determine if the sending was successful; and*

*abort the method for moving objects in response to an unsuccessful sending.*

*56. One or more computer-readable storage media as recited in claim 41, further comprising computer-executable instructions configured to send a move message from the new version of the mobility object at the new host location to the primary object at the current host location, the move message including an indication that the new version of the mobility object has been established at the new host location.*

*57. One or more computer-readable storage media as recited in claim 41, further comprising computer-executable instructions configured to:*

*lock the aggregate object at the current host location in response to the move indication;*

*send a successful move message from the new aggregate object at the new host location to the aggregate object at the current host location;*

*unlock the aggregate object at the current host location;*

*deregister the aggregate object and the primary object at the current host location in response to the successful move message; and*

*store the new host location in a reference holder at the current host location, the reference holder used for forwarding messages received for the primary object at the current host location.*

*58. One or more computer-readable storage media as recited in claim 41, further comprising computer-executable instructions configured to:*

*inform the new version of the primary object at the new host location that movement of the aggregate object at the current host location has started;*

*perform pre-arrival processing by the new version of the primary object at the new host location;*

*determine whether the new version of the primary object at the new host location authorizes completion of the method for moving objects; and*

*abort the method for moving objects in response to a negative authorization from the new version of the primary object at the new host location.*

*59. One or more computer-readable storage media as recited in claim 41, further comprising computer-executable instructions configured to:*

*inform the new aggregate object at the new host location that the aggregate object at the current host location has been deregistered; and*

*perform post-arrival processing by the aggregate object at the current host location.*

*60. One or more computer-readable storage media as recited in claim 41, further comprising computer-executable instructions configured to:*

*inform the aggregate object at the current host location that creation of the new aggregate object at the new host location has completed; and*

*perform post-departure processing by the aggregate object at the current location.*

*61. A method for moving objects in a distributed computing system, comprising:*

*dynamically aggregating a mobility object with a primary object to create an aggregate object located at a current host location, the primary object being unique to the aggregate object and the mobility object providing a mobility functionality for the primary object;*

*receiving a move indication at the mobility object, the move indication instructing the mobility object to move the primary object to a new host location;*

*sending a new version of the mobility object to the new host location in response to the move indication; and*

*sending a new version of the primary object to the new host location in response to a move message from the new version of the mobility object;*

*wherein a new aggregate object is created at the new host location, the new aggregate object having the new version of the primary object associated with the new version of the mobility object, and the new aggregate object including the new version of the primary object as a new primary facet object and the new version of the mobility object as a new facet object.*

*62. The method of claim 61, further comprising:*

*serializing the new version of the mobility object prior to sending;*

*wherein the new version of the mobility object is created at the new host location from the serialized version of the mobility object; and*

*serializing the new version of the primary object prior to sending;*

*wherein the new version of the primary object is created at the new host location from the serialized version of the primary object.*

*63. The method of claim 61, wherein the current host location is characterized by a current host address and port number, and the new host location is characterized by a new host address and port number.*

*64. The method of claim 61, further comprising:*

*locking the aggregate object at the current host location in response to the move indication; and*

*unlocking the aggregate object at the current host location in response to creating the new aggregate object at the new host location.*

*65. The method of claim 61, further comprising retaining an old version of the aggregate object, the primary object, and the mobility object at the current host location.*

*66. The method of claim 61, further comprising instructing the primary object to move to the new host location by invoking a method on the mobility object at the current host location for moving the primary object to the new host location.*

*67. The method of claim 61, further comprising:*

*informing the primary object at the current host location that the primary object is about to be moved in response to the move indication;*

*performing pre-departure processing by the primary object at the current host location;*

*determining whether the primary object is available to move;*

*vetoing the move in response to determining that the primary object is not available to move; and*

*affirming the move in response to determining that the primary object is available to move.*

*68. The method of claim 61, further comprising:*

*completing messages currently being processed by the primary object at the current host location; and*

*suspending new messages arriving at the primary object at the current host location.*

*69. The method of claim 68, further comprising forwarding suspended messages to the new host location for processing.*

*70. The method of claim 61, further comprising:*

*storing the new host location in a reference holder at the current host location; and*

*forwarding messages received at the current host location for the primary object to the new version of the primary object at the new host location.*

*71. The method of claim 61, wherein the new aggregate object and the new version of the primary object are registered at the new host location.*

*72. The method of claim 61, further comprising:*

*deregistering the aggregate object and the primary object at the current host location; and*

*garbage collecting the aggregate object and the primary object at the current host location.*

*73. The method of claim 61, further comprising:*

*sending a message from a proxy to the primary object at the current host location;*

*sending an exception back to the proxy indicating that the primary object has moved to the new host location; and*

*resending the message from the proxy to the new version of the primary object at the new host location in response to the exception.*

*74. The method of claim 61, further comprising:*

*sending a message from a proxy to the primary object at the current host location; and*

*forwarding the message from the current host location to the new version of the primary object at the new host location.*

*75. The method of claim 61, further comprising:*

*evaluating the sending of the new version of the primary object by querying the new version of the primary object to determine if the sending was successful; and*

*aborting the method for moving objects in response to an unsuccessful sending.*

*76. The method of claim 61, further comprising receiving a move message from the new version of the mobility object at the new host location at the primary object at the current host location, the move message including an indication that the new version of the mobility object has been established at the new host location.*

*77. The method of claim 61, further comprising:*

*locking the aggregate object at the current host location in response to the move indication;*

*receiving a successful move message from the new aggregate object at the new host location at the aggregate object at the current host location;*

*unlocking the aggregate object at the current host location;*

*deregistering the aggregate object and the primary object at the current host location in response to the successful move message; and*

*storing the new host location in a reference holder at the current host location, the reference holder used for forwarding messages received for the primary object at the current host location.*

*78. The method of claim 61, further comprising:*

*informing the new version of the primary object at the new host location that movement of the aggregate object at the current host location has started;*

*wherein pre-arrival processing is performed by the new version of the primary object at the new host location;*

*determining whether the new version of the primary object at the new host location authorizes completion of the method for moving objects; and*

*aborting the method for moving objects in response to a negative authorization from the new version of the primary object at the new host location.*

*79. The method of claim 72, further comprising:*

*informing the new aggregate object at the new host location that the aggregate object at the current host location has been deregistered; and*

*performing post-arrival processing by the aggregate object at the current host location.*

*80. The method of claim 61, further comprising:*

*informing the aggregate object at the current host location that creation of the new aggregate object at the new host location has completed; and*

*performing post-departure processing by the aggregate object at the current location.*

*81. One or more computer-readable storage media comprising computer-executable instructions that, when executed, direct a computer to move an object in a distributed computing environment, the computer-executable instructions configured to:*

*dynamically aggregate a mobility object with a primary object to create an aggregate object located at a current host location, the primary object being unique to the aggregate object and the mobility object providing a mobility functionality for the primary object, the aggregate object including the primary object as a primary facet object and the mobility object as a facet object;*

*receive a move indication at the mobility object, the move indication instructing the mobility object to move the primary object to a new host location;*

*send a new version of the mobility object to the new host location in response to the move indication;*

*send a new version of the primary object to the new host location in response to a move message from the new version of the mobility object; and*

*create a new aggregate object at the new host location, the new aggregate object having the new version of the primary object associated with the new version of the mobility object, and the new aggregate object creates the new version of the primary object as a new primary facet object and creates the new version of the mobility object as a new facet object.*

*82. One or more computer-readable storage media as recited in claim 81, further comprising computer-executable instructions configured to:*

*serialize the new version of the mobility object prior to sending;*

*create the new version of the mobility object at the new host location from the serialized version of the mobility object;*

*serialize the new version of the primary object prior to sending; and*

*create the new version of the primary object at the new host location from the serialized version of the primary object.*

*83. One or more computer-readable storage media as recited in claim 81, wherein the current host location is characterized by a current host address and port number, and the new host location is characterized by a new host address and port number.*

*84. One or more computer-readable storage media as recited in claim 81, further comprising computer-executable instructions configured to:*

*lock the aggregate object at the current host location in response to the move indication; and*

*unlock the aggregate object at the current host location in response to creating the new aggregate object at the new host location.*

*85. One or more computer-readable storage media as recited in claim 81, further comprising computer-executable instructions configured to retain an old version of the aggregate object, the primary object, and the mobility object at the current host location.*

*86. One or more computer-readable storage media as recited in claim 81, further comprising computer-executable instructions configured to instruct the primary object to move to the new host location by invoking a method on the mobility object at the current host location for moving the primary object to the new host location.*

*87. One or more computer-readable storage media as recited in claim 81, further comprising computer-executable instructions configured to:*

*inform the primary object at the current host location that the primary object is about to be moved in response to the move indication;*

*perform pre-departure processing by the primary object at the current host location;*

*determine whether the primary object is available to move;*

*veto the move in response to determining that the primary object is not available to move; and*

*affirm the move in response to determining that the primary object is available to move.*

*88. One or more computer-readable storage media as recited in claim 81, further comprising computer-executable instructions configured to:*

*complete messages currently being processed by the primary object at the current host location; and*

*suspend new messages arriving at the primary object at the current host location.*

*89. One or more computer-readable storage media as recited in claim 81, further comprising computer-executable instructions configured to forward suspended messages to the new host location for processing.*

*90. One or more computer-readable storage media as recited in claim 81, further comprising computer-executable instructions configured to:*

*store the new host location in a reference holder at the current host location; and*

*forward messages received at the current host location for the primary object to the new version of the primary object at the new host location.*

*91. One or more computer-readable storage media as recited in claim 81, further comprising computer-executable instructions configured to register the new aggregate object and the new version of the primary object at the new host location.*

*92. One or more computer-readable storage media as recited in claim 81, further comprising computer-executable instructions configured to:*

*deregister the aggregate object and the primary object at the current host location; and*

*garbage collect the aggregate object and the primary object at the current host location.*

*93. One or more computer-readable storage media as recited in claim 81, further comprising computer-executable instructions configured to:*

*send a message from a proxy to the primary object at the current host location;*

*send an exception back to the proxy indicating that the primary object has moved to the new host location; and*

*resend the message from the proxy to the new version of the primary object at the new host location in response to the exception.*

*94. One or more computer-readable storage media as recited in claim 81, further comprising computer-executable instructions configured to:*

*send a message from a proxy to the primary object at the current host location; and*

*forward the message from the current host location to the new version of the primary object at the new host location.*

*95. One or more computer-readable storage media as recited in claim 81, further comprising computer-executable instructions configured to:*

*evaluate the sending of the new version of the primary object by querying the new version of the primary object to determine if the sending was successful; and*

*abort the method for moving objects in response to an unsuccessful sending.*

*96. One or more computer-readable storage media as recited in claim 81, further comprising computer-executable instructions configured to send a move message from the new version of the mobility object at the new host location to the primary object at the current host location, the move message including an indication that the new version of the mobility object has been established at the new host location.*

*97. One or more computer-readable storage media as recited in claim 81, further comprising computer-executable instructions configured to:*

*lock the aggregate object at the current host location in response to the move indication;*

*send a successful move message from the new aggregate object at the new host location to the aggregate object at the current host location;*

*unlock the aggregate object at the current host location;*

*deregister the aggregate object and the primary object at the current host location in response to the successful move message; and*

*store the new host location in a reference holder at the current host location, the reference holder used for forwarding messages received for the primary object at the current host location.*

*98. One or more computer-readable storage media as recited in claim 81, further comprising computer-executable instructions configured to:*

*inform the new version of the primary object at the new host location that movement of the aggregate object at the current host location has started;*

*perform pre-arrival processing by the new version of the primary object at the new host location;*

*determine whether the new version of the primary object at the new host location authorizes completion of the method for moving objects; and*

*abort the method for moving objects in response to a negative authorization from the new version of the primary object at the new host location.*

*99. One or more computer-readable storage media as recited in claim 81, further comprising computer-executable instructions configured to:*

*inform the new aggregate object at the new host location that the aggregate object at the current host location has been deregistered; and*

*perform post-arrival processing by the aggregate object at the current host location.*

*100. One or more computer-readable storage media as recited in claim 81, further comprising computer-executable instructions configured to:*

*inform the aggregate object at the current host location that creation of the new aggregate object at the new host location has completed; and*

*perform post-departure processing by the aggregate object at the current location.*

* * * * *

UNITED STATES PATENT AND TRADEMARK OFFICE

CERTIFICATE OF CORRECTION

PATENT NO. : RE41,706 E
APPLICATION NO. : 11/331418
DATED : September 14, 2010
INVENTOR(S) : Graham W. Glass et al.

It is certified that error appears in the above-identified patent and that said Letters Patent is hereby corrected as shown below:

In column 17, line 37, in Claim 41, delete “new” and insert -- new host --, therefor.

Signed and Sealed this
Eleventh Day of January, 2011

David J. Kappos

David J. Kappos
*Director of the United States Patent and Trademark Office*